(12) United States Patent
Venugopal et al.

(10) Patent No.: US 11,800,528 B2
(45) Date of Patent: Oct. 24, 2023

(54) DIFFERENTIAL CONTROL INFORMATION FOR MULTI-BEAM OPERATION

(71) Applicant: QUALCOMM Incorporated, San Diego, CA (US)

(72) Inventors: Kiran Venugopal, Raritan, NJ (US); Tianyang Bai, Somerville, NJ (US); Junyi Li, Franklin Park, NJ (US); Yan Zhou, San Diego, CA (US); Mostafa Khoshnevisan, San Diego, CA (US); Wooseok Nam, San Diego, CA (US); Sungwoo Park, Seoul (KR); Jung Ho Ryu, Fort Lee, NJ (US); Qian Zhang, Basking Ridge, NJ (US); Ling Ding, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/177,864

(22) Filed: Feb. 17, 2021

(65) Prior Publication Data

US 2021/0307049 A1    Sep. 30, 2021

Related U.S. Application Data

(60) Provisional application No. 63/000,890, filed on Mar. 27, 2020.

(51) Int. Cl.
*H04W 72/23* (2023.01)
*H04W 72/1263* (2023.01)
(Continued)

(52) U.S. Cl.
CPC ....... *H04W 72/23* (2023.01); *H04W 72/1263* (2013.01); *H04W 74/002* (2013.01); *H04W 74/0833* (2013.01)

(58) Field of Classification Search
None
See application file for complete search history.

(56) References Cited

U.S. PATENT DOCUMENTS 10,375,717 B2 *  8/2019  Liu ..................... H04L 5/0053
10,779,251 B2 *  9/2020  Farmanbar ........ H04W 56/0015
(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communication are described. Generally, the described techniques provide for using different configurations for downlink or uplink transmissions associated with different transmission configuration indication (TCI) states (e.g., transmitted on different beams). In one example, a base station may use different configurations for downlink transmissions to a user equipment (UE), and the base station may indicate the different configurations to the UE. For instance, the base station may transmit downlink control information (DCI) indicating a baseline configuration and other configurations as a delta of the baseline configuration. In another example, a base station may dynamically indicate a timing advance to a UE (e.g., in DCI or flow control feedback) for an uplink transmission from the UE associated with a TCI state, and the UE may use the dynamically indicated timing advance for uplink transmissions associated with the TCI state.

27 Claims, 21 Drawing Sheets

(51) Int. Cl.
  *H04W 74/08* (2009.01)
  *H04W 74/00* (2009.01)

(56) References Cited

U.S. PATENT DOCUMENTS

| | | | | |
|---|---|---|---|---|
| 2011/0237283 | A1* | 9/2011 | Shan | H04L 5/0091 455/509 |
| 2013/0070703 | A1* | 3/2013 | Yasukawa | H04W 72/20 370/329 |
| 2014/0241287 | A1* | 8/2014 | Cheng | H04W 72/563 370/329 |
| 2014/0313908 | A1* | 10/2014 | da Silva | H04W 4/70 370/252 |
| 2015/0156753 | A1* | 6/2015 | Shan | H04W 72/0466 370/335 |
| 2016/0135143 | A1* | 5/2016 | Won | H04W 52/243 370/312 |
| 2016/0174194 | A1* | 6/2016 | Suzuki | H04W 72/0446 370/312 |
| 2019/0141693 | A1* | 5/2019 | Guo | H04W 16/14 |
| 2019/0260445 | A1* | 8/2019 | John Wilson | H04B 7/0626 |
| 2019/0268118 | A1* | 8/2019 | Sadiq | H04L 5/0048 |
| 2019/0281587 | A1* | 9/2019 | Zhang | H04W 72/23 |
| 2019/0306850 | A1* | 10/2019 | Zhang | H04B 7/0626 |
| 2019/0306924 | A1* | 10/2019 | Zhang | H04B 7/063 |
| 2019/0334603 | A1* | 10/2019 | Venugopal | H04B 7/0632 |
| 2020/0068548 | A1* | 2/2020 | Guan | H04L 5/0055 |
| 2020/0100154 | A1* | 3/2020 | Cirik | H04W 36/0072 |
| 2020/0100201 | A1* | 3/2020 | Farmanbar | H04W 56/0005 |
| 2020/0100311 | A1* | 3/2020 | Cirik | H04W 72/23 |
| 2020/0120584 | A1* | 4/2020 | Yi | H04L 5/005 |
| 2020/0137821 | A1* | 4/2020 | Cirik | H04W 76/19 |
| 2020/0145280 | A1* | 5/2020 | Cirik | H04L 41/0668 |
| 2020/0153500 | A1* | 5/2020 | Kim | H04B 7/18541 |
| 2020/0220665 | A1* | 7/2020 | Sun | H04L 5/0055 |
| 2021/0105851 | A1* | 4/2021 | Kim | H04W 76/27 |
| 2021/0307049 | A1* | 9/2021 | Venugopal | H04W 72/1273 |

\* cited by examiner

DIFFERENTIAL CONTROL INFORMATION FOR MULTI-BEAM OPERATION

CROSS REFERENCE

The present application for patent claims the benefit of U.S. Provisional Patent Application No. 63/000,890 by VENUGOPAL et al., entitled "DIFFERENTIAL CONTROL INFORMATION FOR MULTI-BEAM OPERATION," filed Mar. 27, 2020, assigned to the assignee hereof, and expressly incorporated by reference herein.

FIELD OF TECHNOLOGY

The following relates generally to wireless communications and more specifically to differential control information for multi-beam operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may support communications with a base station using multiple beams (e.g., multi-beam operation). In such systems, a base station may schedule downlink transmissions to a UE or uplink transmissions from the UE on any of a number of beams. Improved techniques for supporting multi-beam operation in a wireless communications system may be desirable.

SUMMARY

The described techniques relate to improved methods, systems, devices, and apparatuses that support differential control information for multi-beam operation. Generally, the described techniques provide for using different configurations for downlink or uplink transmissions associated with different transmission configuration indication (TCI) states (e.g., transmitted on different beams). In one example, a base station may use different configurations for downlink transmissions to a user equipment (UE), and the base station may indicate the different configurations to the UE. For instance, the base station may transmit downlink control information (DCI) indicating a baseline configuration and other configurations as a delta of the baseline configuration. In another example, a base station may dynamically indicate a timing advance to a UE (e.g., in DCI or flow control feedback) for an uplink transmission from the UE associated with a TCI state, and the UE may use the dynamically indicated timing advance for uplink transmissions associated with the TCI state.

A method of wireless communication at a UE is described. The method may include receiving, from a base station, downlink control information scheduling a first downlink transmission associated with a first transmission configuration indication state and a second downlink transmission associated with a second transmission configuration indication state, identifying, in the downlink control information, an indication of a first configuration for receiving the first downlink transmission and an indication of a delta between the first configuration and a second configuration for receiving the second downlink transmission, and receiving the first downlink transmission using the first configuration and the second downlink transmission using the second configuration.

An apparatus for wireless communication at a UE is described. The apparatus may include a processor, memory coupled with the processor, and instructions stored in the memory. The instructions may be executable by the processor to cause the apparatus to receive, from a base station, downlink control information scheduling a first downlink transmission associated with a first transmission configuration indication state and a second downlink transmission associated with a second transmission configuration indication state, identify, in the downlink control information, an indication of a first configuration for receiving the first downlink transmission and an indication of a delta between the first configuration and a second configuration for receiving the second downlink transmission, and receive the first downlink transmission using the first configuration and the second downlink transmission using the second configuration.

Another apparatus for wireless communication at a UE is described. The apparatus may include means for receiving, from a base station, downlink control information scheduling a first downlink transmission associated with a first transmission configuration indication state and a second downlink transmission associated with a second transmission configuration indication state, identifying, in the downlink control information, an indication of a first configuration for receiving the first downlink transmission and an indication of a delta between the first configuration and a second configuration for receiving the second downlink transmission, and receiving the first downlink transmission using the first configuration and the second downlink transmission using the second configuration.

A non-transitory computer-readable medium storing code for wireless communication at a UE is described. The code may include instructions executable by a processor to receive, from a base station, downlink control information scheduling a first downlink transmission associated with a first transmission configuration indication state and a second downlink transmission associated with a second transmission configuration indication state, identify, in the downlink control information, an indication of a first configuration for receiving the first downlink transmission and an indication of a delta between the first configuration and a second configuration for receiving the second downlink transmission, and receive the first downlink transmission using the first configuration and the second downlink transmission using the second configuration.

Some examples of the method, apparatuses, and non-transitory computer-readable medium described herein may further include operations, features, means, or instructions for receiving an explicit indication of the first configuration in the downlink control information and an explicit indication of the delta between the first configuration and the second configuration in the downlink control information. Some examples of the method, apparatuses, and non-transitory computer-readable medium described herein may further include operations, features, means, or instructions for receiving control signaling indicating a first mapping of indices to configurations for receiving downlink transmissions and a second mapping of indices to deltas between configurations. In some examples of the method, apparatuses, and non-transitory computer-readable medium described herein, identifying the first configuration for receiving the first downlink transmission may include operations, features, means, or instructions for identifying an index in the downlink control information used to indicate a configuration for receiving the first downlink transmission, determining that the index corresponds to the first configuration in the first mapping, and identifying the first configuration for receiving the first downlink transmission based on the determining.

In some examples of the method, apparatuses, and non-transitory computer-readable medium described herein, identifying the second configuration for receiving the second downlink transmission may include operations, features, means, or instructions for identifying an index in the downlink control information used to indicate a configuration for receiving the second downlink transmission, determining that the index corresponds to the delta between the first configuration and the second configuration in the second mapping, applying the delta to the first configuration, and identifying the second configuration for receiving the second downlink transmission based on the applying. In some examples of the method, apparatuses, and non-transitory computer-readable medium described herein, the control signaling includes radio resource control signaling or medium access control signaling.

Some examples of the method, apparatuses, and non-transitory computer-readable medium described herein may further include operations, features, means, or instructions for identifying a codepoint in the downlink control information used to indicate a configuration for receiving the first downlink transmission and a configuration for receiving the second downlink transmission, identifying a mapping of codepoints to configurations for receiving downlink transmissions, where each codepoint maps to a baseline configuration and one or more delta values, determining that the codepoint corresponds to the first configuration and to the delta between the first configuration and the second configuration based on the mapping, where the codepoint includes the indication of the first configuration and the indication of the delta between the first configuration and the second configuration, and identifying the first configuration for receiving the first downlink transmission and the second configuration for receiving the second downlink transmission based on the determining.

Some examples of the method, apparatuses, and non-transitory computer-readable medium described herein may further include operations, features, means, or instructions for receiving control signaling indicating the mapping of codepoints to configurations for receiving downlink transmissions. In some examples of the method, apparatuses, and non-transitory computer-readable medium described herein, the mapping of codepoints to configurations for receiving downlink transmissions may be preconfigured at the UE. In some examples of the method, apparatuses, and non-transitory computer-readable medium described herein, the first configuration or the second configuration includes a modulation and coding scheme, redundancy version, allocation pattern, or a combination thereof.

A method of wireless communication at a base station is described. The method may include identifying a first transmission configuration indication state for transmitting a first downlink transmission to a UE and a second transmission configuration indication state for transmitting a second downlink transmission to the UE, transmitting, to the UE in downlink control information scheduling the first downlink transmission and the second downlink transmission, an indication of a first configuration for receiving the first downlink transmission and an indication of a delta between the first configuration and a second configuration for receiving the second downlink transmission, and transmitting the first downlink transmission using the first configuration and the second downlink transmission using the second configuration.

An apparatus for wireless communication at a base station is described. The apparatus may include a processor, memory coupled with the processor, and instructions stored in the memory. The instructions may be executable by the processor to cause the apparatus to identify a first transmission configuration indication state for transmitting a first downlink transmission to a UE and a second transmission configuration indication state for transmitting a second downlink transmission to the UE, transmit, to the UE in downlink control information scheduling the first downlink transmission and the second downlink transmission, an indication of a first configuration for receiving the first downlink transmission and an indication of a delta between the first configuration and a second configuration for receiving the second downlink transmission, and transmit the first downlink transmission using the first configuration and the second downlink transmission using the second configuration.

Another apparatus for wireless communication at a base station is described. The apparatus may include means for identifying a first transmission configuration indication state for transmitting a first downlink transmission to a UE and a second transmission configuration indication state for transmitting a second downlink transmission to the UE, transmitting, to the UE in downlink control information scheduling the first downlink transmission and the second downlink transmission, an indication of a first configuration for receiving the first downlink transmission and an indication of a delta between the first configuration and a second configuration for receiving the second downlink transmission, and transmitting the first downlink transmission using the first configuration and the second downlink transmission using the second configuration.

A non-transitory computer-readable medium storing code for wireless communication at a base station is described. The code may include instructions executable by a processor to identify a first transmission configuration indication state for transmitting a first downlink transmission to a UE and a second transmission configuration indication state for transmitting a second downlink transmission to the UE, transmit, to the UE in downlink control information scheduling the first downlink transmission and the second downlink transmission, an indication of a first configuration for receiving the first downlink transmission and an indication of a delta between the first configuration and a second configuration for receiving the second downlink transmission, and transmit the first downlink transmission using the first configuration and the second downlink transmission using the second configuration.

In some examples of the method, apparatuses, and non-transitory computer-readable medium described herein, transmitting the indication of the first configuration may include operations, features, means, or instructions for transmitting an explicit indication of the first configuration in the downlink control information. In some examples of the method, apparatuses, and non-transitory computer-readable medium described herein, transmitting the indication of the delta between the first configuration and the second configuration may include operations, features, means, or instructions for transmitting an explicit indication of the delta between the first configuration and the second configuration in the downlink control information. Some examples of the method, apparatuses, and non-transitory computer-readable medium described herein may further include operations, features, means, or instructions for transmitting control signaling indicating a first mapping of indices to configurations for receiving downlink transmissions and a second mapping of indices to deltas between configurations.

In some examples of the method, apparatuses, and non-transitory computer-readable medium described herein, transmitting the indication of the first configuration for receiving the first downlink transmission may include operations, features, means, or instructions for transmitting an index in the downlink control information indicating the first configuration for receiving the first downlink transmission, where the index corresponds to the first configuration in the first mapping. In some examples of the method, apparatuses, and non-transitory computer-readable medium described herein, transmitting the indication of the second configuration for receiving the second downlink transmission may include operations, features, means, or instructions for identifying the delta between the first configuration and the second configuration, and transmitting an index in the downlink control information indicating the delta between the first configuration and the second configuration, where the index corresponds to the delta in the second mapping. In some examples of the method, apparatuses, and non-transitory computer-readable medium described herein, the control signaling includes radio resource control signaling or medium access control signaling.

Some examples of the method, apparatuses, and non-transitory computer-readable medium described herein may further include operations, features, means, or instructions for identifying a mapping of codepoints to configurations for receiving downlink transmissions, where each codepoint maps to a baseline configuration and one or more delta values, and identifying a codepoint in the mapping corresponding to the first configuration and the delta between the first configuration and the second configuration. In some examples of the method, apparatuses, and non-transitory computer-readable medium described herein, transmitting the indication of the first configuration may include operations, features, means, or instructions for transmitting the codepoint in the downlink control information indicating the first configuration and the delta between the first configuration and the second configuration.

Some examples of the method, apparatuses, and non-transitory computer-readable medium described herein may further include operations, features, means, or instructions for transmitting control signaling indicating the mapping of codepoints to configurations for receiving downlink transmissions. In some examples of the method, apparatuses, and non-transitory computer-readable medium described herein, the mapping of codepoints to configurations for receiving downlink transmissions may be preconfigured at the base station. In some examples of the method, apparatuses, and non-transitory computer-readable medium described herein, the first configuration or the second configuration includes a modulation and coding scheme, redundancy version, allocation pattern, or a combination thereof.

A method of wireless communication at a UE is described. The method may include receiving, from a base station, downlink control information scheduling an uplink transmission from the UE to the base station, the uplink transmission associated with a transmission configuration indication state, identifying, in the downlink control information, an indication of whether to use a first timing advance or a second timing advance for the uplink transmission, and transmitting the uplink transmission using the first timing advance or the second timing advance based on the indication in the downlink control information.

An apparatus for wireless communication at a UE is described. The apparatus may include a processor, memory coupled with the processor, and instructions stored in the memory. The instructions may be executable by the processor to cause the apparatus to receive, from a base station, downlink control information scheduling an uplink transmission from the UE to the base station, the uplink transmission associated with a transmission configuration indication state, identify, in the downlink control information, an indication of whether to use a first timing advance or a second timing advance for the uplink transmission, and transmit the uplink transmission using the first timing advance or the second timing advance based on the indication in the downlink control information.

Another apparatus for wireless communication at a UE is described. The apparatus may include means for receiving, from a base station, downlink control information scheduling an uplink transmission from the UE to the base station, the uplink transmission associated with a transmission configuration indication state, identifying, in the downlink control information, an indication of whether to use a first timing advance or a second timing advance for the uplink transmission, and transmitting the uplink transmission using the first timing advance or the second timing advance based on the indication in the downlink control information.

A non-transitory computer-readable medium storing code for wireless communication at a UE is described. The code may include instructions executable by a processor to receive, from a base station, downlink control information scheduling an uplink transmission from the UE to the base station, the uplink transmission associated with a transmission configuration indication state, identify, in the downlink control information, an indication of whether to use a first timing advance or a second timing advance for the uplink transmission, and transmit the uplink transmission using the first timing advance or the second timing advance based on the indication in the downlink control information.

Some examples of the method, apparatuses, and non-transitory computer-readable medium described herein may further include operations, features, means, or instructions for transmitting a first random-access message to the base station as part of a random-access procedure used to synchronize with the base station, and receiving a second random-access message from the base station in response to the first random-access message, the second random-access message indicating the first timing advance. In some examples of the method, apparatuses, and non-transitory computer-readable medium described herein, the second timing advance may be associated with the transmission configuration indication state of the uplink transmission.

A method of wireless communication at a base station is described. The method may include identifying an uplink transmission to schedule from a UE to the base station, the uplink transmission associated with a transmission configuration indication state, transmitting, to the UE in downlink control information scheduling the uplink transmission, an indication of whether the UE is to use a first timing advance or a second timing advance for the uplink transmission, and receiving the uplink transmission from the UE in accordance with the first timing advance or the second timing advance based on the indication in the downlink control information.

An apparatus for wireless communication at a base station is described. The apparatus may include a processor, memory coupled with the processor, and instructions stored in the memory. The instructions may be executable by the processor to cause the apparatus to identify an uplink transmission to schedule from a UE to the base station, the uplink transmission associated with a transmission configuration indication state, transmit, to the UE in downlink control information scheduling the uplink transmission, an indication of whether the UE is to use a first timing advance or a second timing advance for the uplink transmission, and receive the uplink transmission from the UE in accordance with the first timing advance or the second timing advance based on the indication in the downlink control information.

Another apparatus for wireless communication at a base station is described. The apparatus may include means for identifying an uplink transmission to schedule from a UE to the base station, the uplink transmission associated with a transmission configuration indication state, transmitting, to the UE in downlink control information scheduling the uplink transmission, an indication of whether the UE is to use a first timing advance or a second timing advance for the uplink transmission, and receiving the uplink transmission from the UE in accordance with the first timing advance or the second timing advance based on the indication in the downlink control information.

A non-transitory computer-readable medium storing code for wireless communication at a base station is described. The code may include instructions executable by a processor to identify an uplink transmission to schedule from a UE to the base station, the uplink transmission associated with a transmission configuration indication state, transmit, to the UE in downlink control information scheduling the uplink transmission, an indication of whether the UE is to use a first timing advance or a second timing advance for the uplink transmission, and receive the uplink transmission from the UE in accordance with the first timing advance or the second timing advance based on the indication in the downlink control information.

Some examples of the method, apparatuses, and non-transitory computer-readable medium described herein may further include operations, features, means, or instructions for receiving a first random-access message from the UE as part of a random-access procedure used to synchronize with the base station, and transmitting a second random-access message to the UE in response to the first random-access message, the second random-access message indicating the first timing advance. In some examples of the method, apparatuses, and non-transitory computer-readable medium described herein, the second timing advance may be associated with the transmission configuration indication state of the uplink transmission.

A method of wireless communication at a UE is described. The method may include receiving, from a base station, downlink control information scheduling a first uplink transmission from the UE to the base station, the first uplink transmission associated with a transmission configuration indication state, transmitting the first uplink transmission using a first timing advance, receiving flow control feedback from the base station indicating a second timing advance for subsequent uplink transmissions associated with the transmission configuration indication state from the UE, and transmitting a second uplink transmission to the base station using the second timing advance, the second uplink transmission associated with the transmission configuration indication state.

An apparatus for wireless communication at a UE is described. The apparatus may include a processor, memory coupled with the processor, and instructions stored in the memory. The instructions may be executable by the processor to cause the apparatus to receive, from a base station, downlink control information scheduling a first uplink transmission from the UE to the base station, the first uplink transmission associated with a transmission configuration indication state, transmit the first uplink transmission using a first timing advance, receive flow control feedback from the base station indicating a second timing advance for subsequent uplink transmissions associated with the transmission configuration indication state from the UE, and transmit a second uplink transmission to the base station using the second timing advance, the second uplink transmission associated with the transmission configuration indication state.

Another apparatus for wireless communication at a UE is described. The apparatus may include means for receiving, from a base station, downlink control information scheduling a first uplink transmission from the UE to the base station, the first uplink transmission associated with a transmission configuration indication state, transmitting the first uplink transmission using a first timing advance, receiving flow control feedback from the base station indicating a second timing advance for subsequent uplink transmissions associated with the transmission configuration indication state from the UE, and transmitting a second uplink transmission to the base station using the second timing advance, the second uplink transmission associated with the transmission configuration indication state.

A non-transitory computer-readable medium storing code for wireless communication at a UE is described. The code may include instructions executable by a processor to receive, from a base station, downlink control information scheduling a first uplink transmission from the UE to the base station, the first uplink transmission associated with a transmission configuration indication state, transmit the first uplink transmission using a first timing advance, receive flow control feedback from the base station indicating a second timing advance for subsequent uplink transmissions associated with the transmission configuration indication state from the UE, and transmit a second uplink transmission to the base station using the second timing advance, the second uplink transmission associated with the transmission configuration indication state.

Some examples of the method, apparatuses, and non-transitory computer-readable medium described herein may further include operations, features, means, or instructions for applying the delta to the first timing advance, and identifying the second timing advance for subsequent uplink transmissions based on the applying.

A method of wireless communication at a base station is described. The method may include transmitting, to a UE, downlink control information scheduling a first uplink transmission from the UE to the base station, the first uplink transmission associated with a transmission configuration indication state, receiving the first uplink transmission from the UE in accordance with a first timing advance, transmitting flow control feedback to the UE indicating a second timing advance for subsequent uplink transmissions associated with the transmission configuration indication state from the UE, and receiving a second uplink transmission from the UE in accordance with the second timing advance, the second uplink transmission associated with the transmission configuration indication state.

An apparatus for wireless communication at a base station is described. The apparatus may include a processor, memory coupled with the processor, and instructions stored in the memory. The instructions may be executable by the processor to cause the apparatus to transmit, to a UE, downlink control information scheduling a first uplink transmission from the UE to the base station, the first uplink transmission associated with a transmission configuration indication state, receive the first uplink transmission from the UE in accordance with a first timing advance, transmit flow control feedback to the UE indicating a second timing advance for subsequent uplink transmissions associated with the transmission configuration indication state from the UE, and receive a second uplink transmission from the UE in accordance with the second timing advance, the second uplink transmission associated with the transmission configuration indication state.

Another apparatus for wireless communication at a base station is described. The apparatus may include means for transmitting, to a UE, downlink control information scheduling a first uplink transmission from the UE to the base station, the first uplink transmission associated with a transmission configuration indication state, receiving the first uplink transmission from the UE in accordance with a first timing advance, transmitting flow control feedback to the UE indicating a second timing advance for subsequent uplink transmissions associated with the transmission configuration indication state from the UE, and receiving a second uplink transmission from the UE in accordance with the second timing advance, the second uplink transmission associated with the transmission configuration indication state.

A non-transitory computer-readable medium storing code for wireless communication at a base station is described. The code may include instructions executable by a processor to transmit, to a UE, downlink control information scheduling a first uplink transmission from the UE to the base station, the first uplink transmission associated with a transmission configuration indication state, receive the first uplink transmission from the UE in accordance with a first timing advance, transmit flow control feedback to the UE indicating a second timing advance for subsequent uplink transmissions associated with the transmission configuration indication state from the UE, and receive a second uplink transmission from the UE in accordance with the second timing advance, the second uplink transmission associated with the transmission configuration indication state.

In some examples of the method, apparatuses, and non-transitory computer-readable medium described herein, transmitting flow control feedback to the UE indicating the second timing advance may include operations, features, means, or instructions for identifying a delta between the first timing advance and the second timing advance, and transmitting flow control feedback indicating the delta between the first timing advance and the second timing advance based on the identifying.

DETAILED DESCRIPTION

In some wireless communications systems, a user equipment (UE) may support communications with a base station using multiple beams. In such systems, transmissions on different beams (e.g., transmissions associated with different transmission configuration indication (TCI) states) may be associated with the same configuration. For instance, a base station may transmit downlink control information (DCI) to a UE that schedules downlink transmissions on multiple beams to the UE, and the DCI may indicate a single configuration (e.g., modulation and coding scheme (MCS)) for the downlink transmissions on the multiple beams. In such cases, however, because these transmissions may be constrained to the same configuration, the potential of different beams may not be maximized. For instance, a base station may use a low MCS for transmissions to a UE on all beams to improve the chances that a transmission on one of the beams (e.g., a low quality beam) may be received. However, by using the low MCS, the throughput of the transmissions on other beams (e.g., higher quality beams) may be limited, resulting in reduced throughput in a wireless communications system.

As described herein, a wireless communications system may support efficient techniques for using different configurations for downlink or uplink transmissions on different beams (e.g., associated with different TCI states) to improve throughput. In one example, a base station may use different configurations for downlink transmissions to a UE, and the base station may indicate the different configurations to the UE. For instance, the base station may transmit DCI indicating a baseline configuration and other configurations as a delta of the baseline configuration. Alternatively, the base station may indicate the different configurations by transmitting codepoints in DCI that correspond to the different configurations. In another example, a base station may dynamically indicate a timing advance to a UE (e.g., in DCI or flow control feedback) for an uplink transmission from the UE associated with a TCI state, and the UE may use the dynamically indicated timing advance for uplink transmissions associated with the TCI state.

Aspects of the disclosure introduced above are described below in the context of a wireless communications system. Examples of processes and signaling exchanges that support differential control information for multi-beam operation are then described. Aspects of the disclosure are further illustrated by and described with reference to apparatus diagrams, system diagrams, and flowcharts that relate to differential control information for multi-beam operation.

Figure 1:
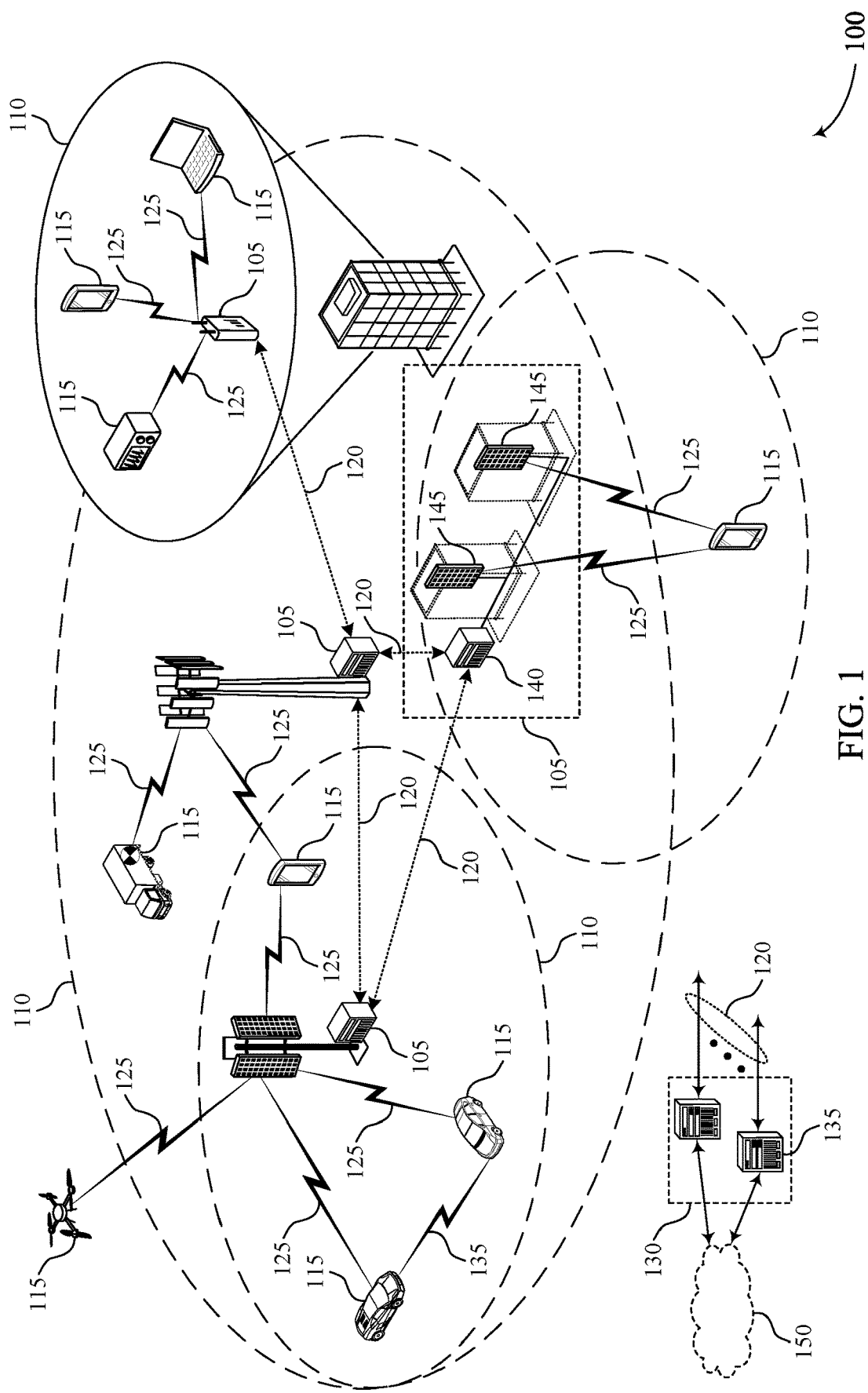
FIG. 1 illustrates an example of a wireless communications system that supports differential control information for multi-beam operation in accordance with aspects of the present disclosure.

FIG. 1 illustrates an example of a wireless communications system 100 that supports differential control information for multi-beam operation in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a base station 105 may transmit downlink control information (DCI) to schedule communications with a UE 115. Upon detection of a PDCCH including DCI (e.g., with DCI format 1_0, 1_1, or 1_2), a UE 115 may decode the corresponding PDSCHs as indicated (e.g., scheduled) by the DCI. DCI may indicate the parameters to be used by a UE 115 for receiving a PDSCH. For instance, the DCI may indicate the time-domain resource allocation (e.g., one bit), MCS (e.g., five bits), HARQ process number, TCI (e.g., three bits if a tci-PresentInDCI flag is enabled). Similarly, DCI (e.g., DCI format 0_0, 0_1, and 0_2) may be used for scheduling uplink shared channel (e.g., PUSCH) transmissions, and the DCI may carry information associated with the uplink transmission. In some cases, a single DCI may indicate multiple TCI states in a codepoint to configure UE 115 reception of multiple PDSCH transmissions (e.g., using time-division multiplexing (TDM) or frequency division multiplexing (FDM)). For instance, depending on the higher layer parameter 'RepSchemeEnabler" (e.g., which may be 'FDMSchemeA', 'FDMSchemeB', or 'TDMSchemeA'), a UE 115 may be indicated with two TCI states in the DCI field 'Transmission Configuration Indication.'

Figure 2:
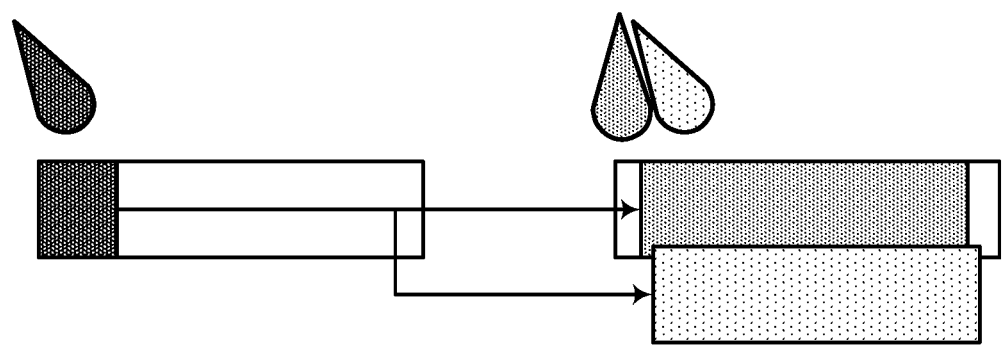
FIG. 2 illustrates an example of a DCI scheduling multiple physical downlink shared channel (PDSCH) transmissions associated with multiple transmission configuration indication (TCI) states in accordance with aspects of the present disclosure.

FIG. 2 illustrates an example of DCI scheduling multiple PDSCH transmissions 200 associated with multiple TCI states in accordance with aspects of the present disclosure. In the example of FIG. 2, a base station 105 may transmit DCI using a first beam 205 (e.g., associated with a first TCI state), and the DCI may schedule PDSCH transmissions to a UE on a second beam 210 (e.g., associated with a second TCI state) and a third beam 215 (e.g., associated with a third TCI state). The different TCIs (e.g., beams or transmission and reception points (TRPs)) indicated by DCI may be capable of supporting different configurations (e.g., based on hardware implementation, channel conditions, UE reports, etc.). However, different TCIs may be constrained to share the same value for most of the configurations as the same transport block is repeated in some of the schemes. The configurations may include an MCS (e.g., including modulation order), redundancy version, allocation pattern, etc. If transmissions associated with different TCI states are constrained to the same configuration, the potential of these transmissions may not be maximized. Wireless communications system 100 may support efficient techniques for using different configurations for downlink or uplink transmissions on different beams (e.g., associated with different TCI states) to maximize throughput.

Figure 3:
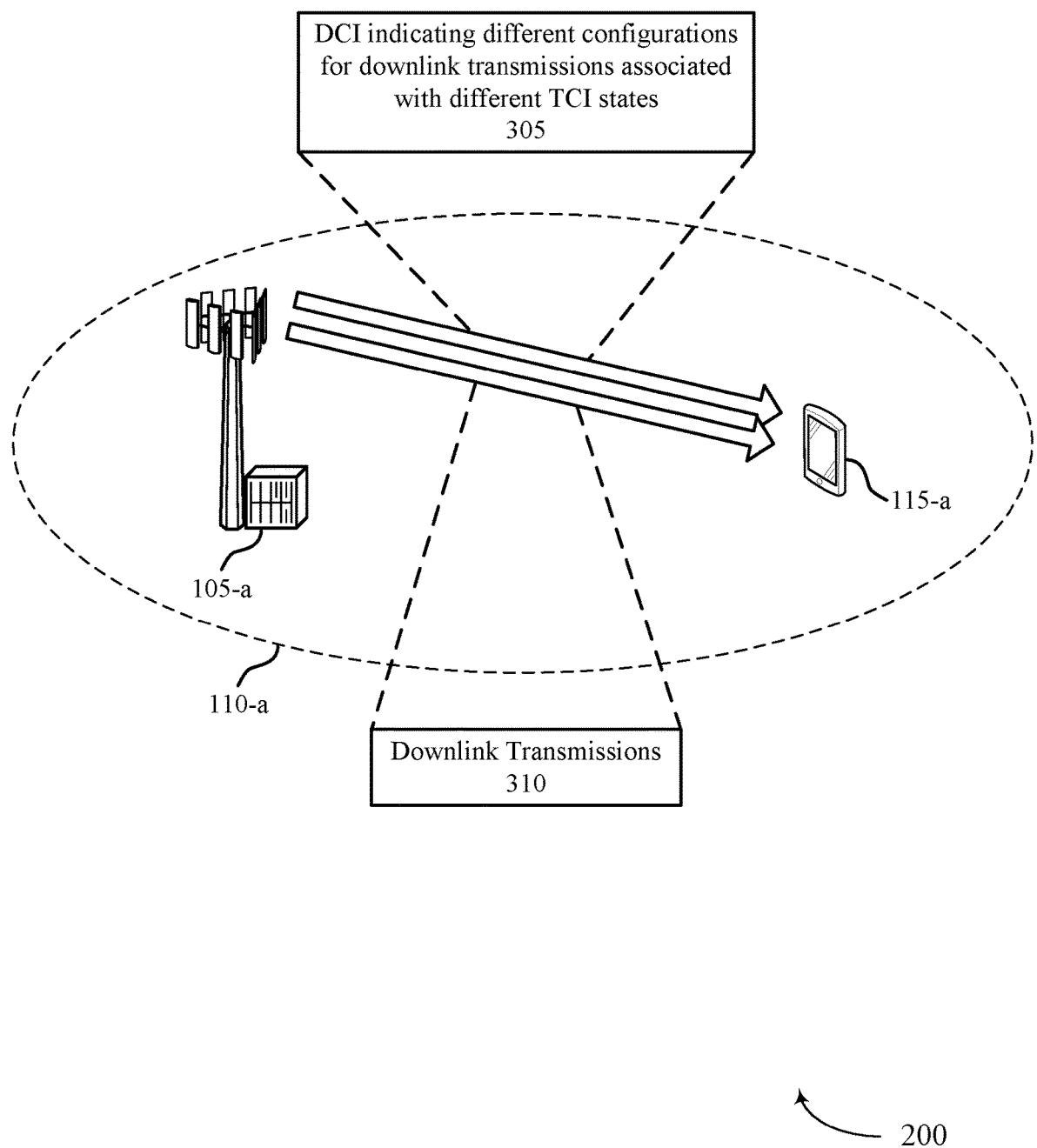
FIG. 3 illustrates an example of a wireless communications system that supports differential control information for multi-beam operation in accordance with aspects of the present disclosure.

FIG. 3 illustrates an example of a wireless communications system 300 that supports differential control information for multi-beam operation in accordance with aspects of the present disclosure. The wireless communications system 300 includes a UE 115-a, which may be an example of a UE 115 described with reference to FIGS. 1 and 2. The wireless communications system 300 also includes a base station 105-a, which may be an example of a base station 105 described with reference to FIGS. 1 and 2. The base station 105-*a* may provide communication coverage for a coverage area 110-*a*. The wireless communications system 300 may implement aspects of wireless communications system 100. For example, the wireless communications system 300 may support efficient techniques for using different configurations for downlink or uplink transmissions on different beams (e.g., associated with different TCI states) to maximize throughput. In particular, base station 105-*a* may indicate separate values for each configuration for different downlink transmissions associated with different TCI states with limited overhead (e.g., without consuming excessive resources (bits) in DCI)).

In the example of FIG. 3, the base station 105-*a* may transmit DCI 305 to the UE 115-*a* scheduling multiple PDSCH transmissions 310 associated with multiple TCI states to the UE 115-*a*. Instead of signaling each configuration associated with different TCI states, and instead of constraining the multiple TCI states to the same configuration, the base station 105-*a* may signal a baseline configuration to the UE 115-*a*, and the base station 105-*a* may signal other configurations each as a delta of the baseline configuration. That is, the differential value of a configuration may be indicated to save overhead.

In some cases, the base station 105-*a* may convey the baseline configuration and the delta for another configuration explicitly in DCI. For example, for a modulation order of two in a first, baseline configuration used for a first downlink transmission associated with a first TCI state, the base station 105-*a* may indicate the modulation order using bits that indicate a value of two (e.g., 10). Then, for a modulation order of three in a second configuration used for a second downlink transmission associated with a second TCI state, the base station 105-*a* may indicate the modulation order using bits that indicate a value of one (e.g., 01). That is, rather than using bits that indicate a value of three for the second configuration, the base station 105-*a* may indicate the value of three for the second configuration as a delta of the first configuration. The UE 115-*a* may then apply the delta (e.g., add one to two) to identify the second configuration (e.g., modulation order of three) for the second downlink transmission.

In other cases, the base station 105-*a* may include a single bit (or fewer bits) in DCI to indicate the different configurations for the UE 115-*a* to use to receive the multiple PDSCH transmissions associated with the different TCI states. In such cases, the single bit (or fewer bits) may indicate an index, and the UE 115-*a* may identify a first mapping of indexes to baseline configurations, and a second mapping of indexes to delta values. Accordingly, the UE 115-*a* may identify an index in DCI corresponding to a baseline configuration, and the UE 115-*a* may use the index to reference the first mapping to identify the baseline configuration. Similarly, the UE 115-*a* may identify an index in DCI corresponding to a delta value, and the UE 115-*a* may use the index to reference the second mapping to identify the delta value. The UE 115-*a* may then apply (e.g., add or subtract) the delta value to the baseline configuration to identify another configuration. The first mapping and the second mapping may be preconfigured at the UE 115-*a* and the base station 105-*a*, or the base station 105-*a* may signal the first mapping and the second mapping to the UE 115-*a*. Thus, in this setting, the actual delta values may be signaled in a MAC control element (MAC-CE) or may be preconfigured in radio resource control (RRC) signaling.

In yet other cases, the base station 105-*a* may include a single codepoint in DCI indicating different configurations for the UE 115-*a* to use to receive the multiple PDSCH transmissions associated with the different TCI states. In such cases, the UE 115-*a* may identify a mapping of codepoints to configurations for downlink transmissions. Each codepoint may correspond to a baseline configuration and one or more delta values. Accordingly, the UE 115-*a* may use the codepoint in DCI to reference the mapping to identify a baseline configuration, and the UE 115-*a* may use the baseline configuration to receive a downlink transmission associated with a first TCI state from the base station 105-*a*. The UE 115-*a* may also use the codepoint in DCI to reference the mapping to identify delta values, and the UE 115-*a* may apply (e.g., add or subtract) the delta values to the baseline configuration to identify other configurations (e.g., second, third, etc. configurations) for receiving other downlink transmissions associated with different TCI states (e.g., second, third, etc. TCI states) from the base station 105-*a*.

In the above examples, the UE 115-*a* may be able to map TCI states to configurations for receiving downlink transmissions associated with the TCI states. For instance, the first TCI state indicated in DCI may correspond to the first, baseline configuration indicated in the DCI, the second TCI state indicated in DCI may correspond to the second configuration indicated in the DCI, etc. That is, the order of TCI states indicated in DCI may correspond to the order of configurations indicated in the DCI. In addition, although the examples described above relate to a base station 105-*a* using a single DCI to schedule multiple downlink transmissions associated with multiple TCI states, it is to be understood that the same techniques apply if the base station 105-*a* uses multiple DCIs to schedule the multiple downlink transmissions. In particular, a first DCI scheduling a first downlink transmission associated with a first TCI state may include a first, baseline configuration used for the first downlink transmission, and a second DCI scheduling a second downlink transmission associated with a second TCI state may include a delta between the first configuration and a second configuration used for the second downlink transmission.

Figure 4:
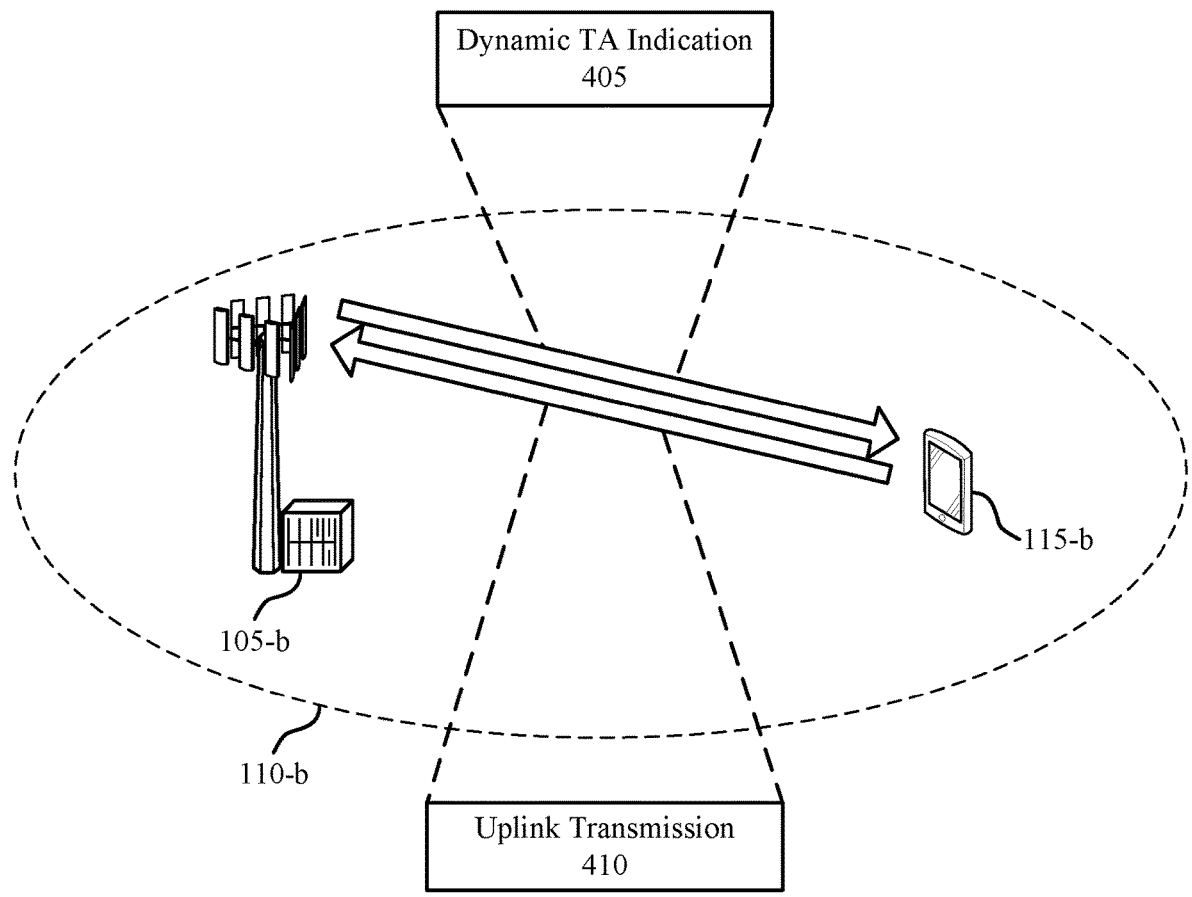
FIG. 4 illustrates an example of a wireless communications system that supports differential control information for multi-beam operation in accordance with aspects of the present disclosure.

FIG. 4 illustrates an example of a wireless communications system 400 that supports differential control information for multi-beam operation in accordance with aspects of the present disclosure. The wireless communications system 400 includes a UE 115-*b*, which may be an example of a UE 115 described with reference to FIGS. 1-3. The wireless communications system 400 also includes a base station 105-*b*, which may be an example of a base station 105 described with reference to FIGS. 1-3. The base station 105-*b* may provide communication coverage for a coverage area 110-*b*. The wireless communications system 400 may implement aspects of wireless communications system 100. For example, the wireless communications system 400 may support efficient techniques for using different configurations for downlink or uplink transmissions on different beams (e.g., associated with different TCI states) to maximize throughput. In particular, the base station 105-*b* may dynamically indicate a timing advance for the UE 115-*b* to use for uplink transmissions to the base station 105-*b*.

The base station 105-*b* may expect the UE 115-*b* to appropriately advance uplink transmissions to maintain uplink time alignment (e.g., the UE 115-*b* may be RRC configured to maintain uplink time alignment). The UE 115-*b* may perform a random-access procedure to obtain an initial timing advance. In particular, the UE 115-*b* may transmit a random-access message to the base station 105-*b*, and the UE 115-*b* may receive a random-access response (RAR) indicating the initial timing advance. The initial timing advance may be common to a group of TCIs (e.g., used for transmissions on a component carrier), and the base station 105-*b* may signal updates to the timing advance (e.g., for the group of TCIs) via a MAC-CE. In some cases, for multi-beam (e.g., multi-panel) uplink transmissions, different timing advances may be appropriate for different spatial relation configurations. However, if a single value is specified for a timing advance per component carrier, uplink transmissions on some beams may be unaligned, resulting in increased interference and reduced throughput.

In the example of FIG. 4, base station 105-*a* may signal a dynamic timing advance indication 405 for the UE 115-*b* to use for an uplink transmission 410 (e.g., if the base station 105-*a* determines that different timing advance values are appropriate for different uplink beams based on recent measurements on uplink transmissions from the UE 115-*b*).

In one example, the base station 105-*b* may signal a single bit in DCI used to schedule an uplink transmission to indicate whether the UE 115-*b* is to use different timing advance values for different uplink beams or panels. In this example, the UE 115-*b* may have different timing advance values associated with different beams stored in memory. Thus, for an uplink transmission associated with a TCI state, the single bit may indicate whether the UE 115-*b* is to use an initial timing advance value (e.g., identified in a random-access procedure) or a timing advance value associated with the TCI state for the uplink transmission. In the event that the UE 115-*b* does not have memory of a timing advance value associated with the TCI state, or the UE 115-*b* otherwise uses an incorrect timing advance value, the base station 105-*b* may signal a differential (e.g., delta) timing advance value to the UE 115-*b* instead of issuing a PDCCH order and triggering a random-access procedure to signal the timing advance (e.g., which causes increased latency).

In another example, the base station 105-*b* may multiplex HARQ feedback with a differential timing advance value (e.g., +/−advance) for the UE 115-*b* to apply to a current timing advance value (e.g., the initial timing advance value). For instance, the base station 105-*b* may schedule an uplink transmission associated with a TCI state from the UE 115-*b*, and the UE 115-*b* may use a current timing advance value for the uplink transmission. If the base station 105-*b* receives the uplink transmission and determines that a different timing advance value is appropriate for the TCI state, the base station 105-*b* may signal the differential timing advance value to the UE 115-*b* in a HARQ feedback transmission. The UE 115-*b* may receive the differential timing advance value and may adjust a timing advance at the UE (e.g., add or subtract the differential timing advance value to the current timing advance value). The UE 115-*b* may then transmit subsequent uplink transmissions to the base station 105-*b* using the updated timing advance value.

Figure 5:
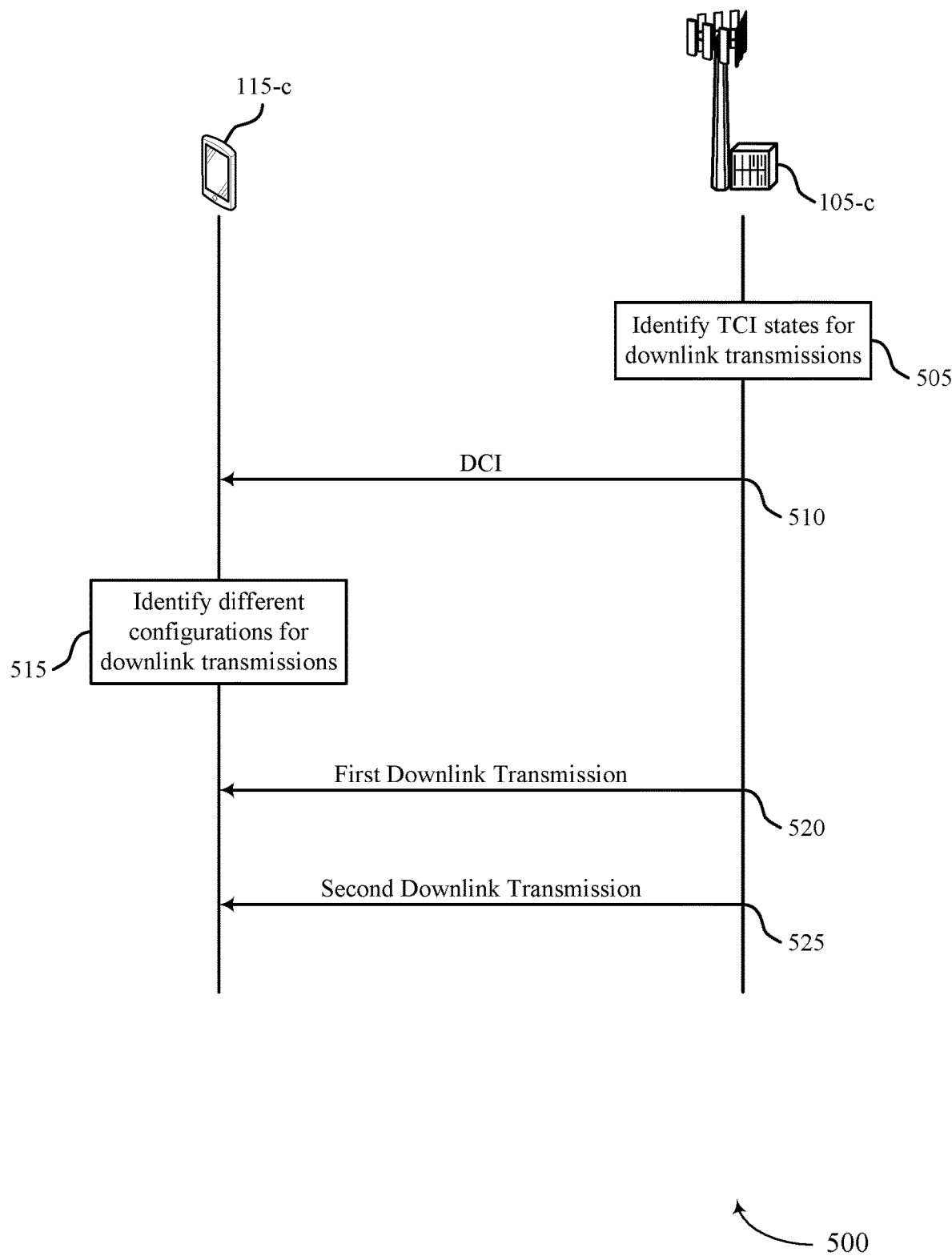
FIG. 5 illustrates an example of a process flow that supports differential control information for multi-beam operation in accordance with aspects of the present disclosure.

FIG. 5 illustrates an example of a process flow 500 that supports differential control information for multi-beam operation in accordance with aspects of the present disclosure. Process flow 500 illustrates aspects of techniques performed by a UE 115-*c*, which may be an example of a UE 115 described with reference to FIGS. 1-4. Process flow 500 also illustrates aspects of techniques performed by a base station 105-*c*, which may be an example of a base station 105 described with reference to FIGS. 1-4. Process flow 500 may support efficient techniques for using different configurations for downlink or uplink transmissions on different beams (e.g., associated with different TCI states) to maximize throughput.

At 505, the base station 105-*c* may identify a first TCI state for transmitting a first downlink transmission to the UE 115-*c* and a second TCI state for transmitting a second downlink transmission to the UE 115-*c*. At 510, the base station 105-*c* may then transmit DCI to the UE 115-*c* scheduling the first downlink transmission and the second downlink transmission. The base station 105-*c* may also transmit, in the DCI, an indication of a first configuration for receiving the first downlink transmission and an indication of a delta between the first configuration and a second configuration for receiving the second downlink transmission. At 515, the UE 115-*c* may identify the first configuration for receiving the first downlink transmission and the second configuration for receiving the second downlink transmission based on the DCI.

In some examples, the base station 105-*c* may transmit, and the UE 115-*c* may receive, an explicit indication of the first configuration in the DCI and an explicit indication of the delta between the first configuration and the second configuration in the DCI. In other examples, the UE 115-*c* may identify a first mapping of indices to configurations for receiving downlink transmissions and a second mapping of indices to deltas between configurations. The base station 105-*c* may transmit control signaling (e.g., RRC or MAC signaling) indicating the first mapping and the second mapping to the UE 115-*c*. Alternatively, the first mapping and the second mapping may be preconfigured at the UE 115-*c* and the base station 105-*c*.

The UE 115-*c* may identify an index in the DCI used to indicate the configuration for receiving the first downlink transmission, and the UE 115-*c* may determine that the index corresponds to the first configuration in the first mapping. The UE 115-*c* may then identify the first configuration for receiving the first downlink transmission based on the determining. The UE 115-*c* may also identify an index in the DCI used to indicate a configuration for receiving the second downlink transmission, and the UE 115-*c* may determine that the index corresponds to the delta between the first configuration and the second configuration in the second mapping. The UE 115-*c* may then apply the delta to the first configuration and identify the second configuration for receiving the second downlink transmission based on the applying.

In yet other examples, the base station 105-*c* may identify a mapping of codepoints to configurations for receiving downlink transmissions, where each codepoint maps to a baseline configuration and one or more delta values. The base station 105-*c* may identify a codepoint in the mapping corresponding to the first configuration and the delta between the first configuration and the second configuration. The base station 105-*c* may then transmit the codepoint in the DCI indicating the first configuration and the delta between the first configuration and the second configuration. The UE 115-*c* may receive the codepoint in the DCI and determine that the codepoint corresponds to the first configuration and to the delta between the first configuration and the second configuration based on the mapping. The UE 115-*c* may then identify the first configuration for receiving the first downlink transmission and the second configuration for receiving the second downlink transmission based on the determining.

The base station 105-*c* may transmit control signaling (e.g., RRC or MAC signaling) indicating the mapping of codepoints to configurations for receiving downlink transmissions. Alternatively, the mapping of codepoints to configurations for receiving downlink transmissions may be preconfigured at the UE 115-*c* and the base station 105-*c*. In some cases, rather than transmitting a single codepoint indicating a first, baseline configuration and one or more delta values, the base station 105-*c* may transmit a codepoint for the first, baseline configuration and a codepoint for each delta value. In such cases, the UE 115-c and the base station 105-c may be configured with a first mapping of codepoints to baseline configurations and a second mapping of codepoints to delta values. Alternatively, the base station 105-c may transmit a codepoint for each configuration that directly indicates the configuration (e.g., without delta values). In such cases, the UE 115-c and the base station 105-c may be configured with a single mapping of codepoints to configurations.

At 520, the base station 105-c may transmit the first downlink transmission using the first configuration to the UE 115-c. The UE 115-c may receive and decode the first downlink transmission using the first configuration. Similarly, at 525, the base station 105-c may transmit the second downlink transmission using the second configuration to the UE 115-c. The UE 115-c may receive and decode the second downlink transmission using the second configuration. Although a configuration herein is described as a configuration for receiving a downlink transmission, it is to be understood that the configurations is simply associated with the downlink transmission (e.g., is used to generate and transmit the downlink transmission). Further, although aspects of the techniques herein are described separately, it is to be understood that the techniques may be combined. For instance, the base station 105-c may indicate a baseline configuration explicitly in DCI, and the base station 105-c may indicate an index in the DCI corresponding to the delta between the baseline configuration and another configuration. The UE 115-c may then identify the baseline configuration from the DCI (e.g., only from the DCI), and the UE 115-c may use the index to reference a mapping to identify the delta between the baseline configuration and the other configuration.

Figure 6:
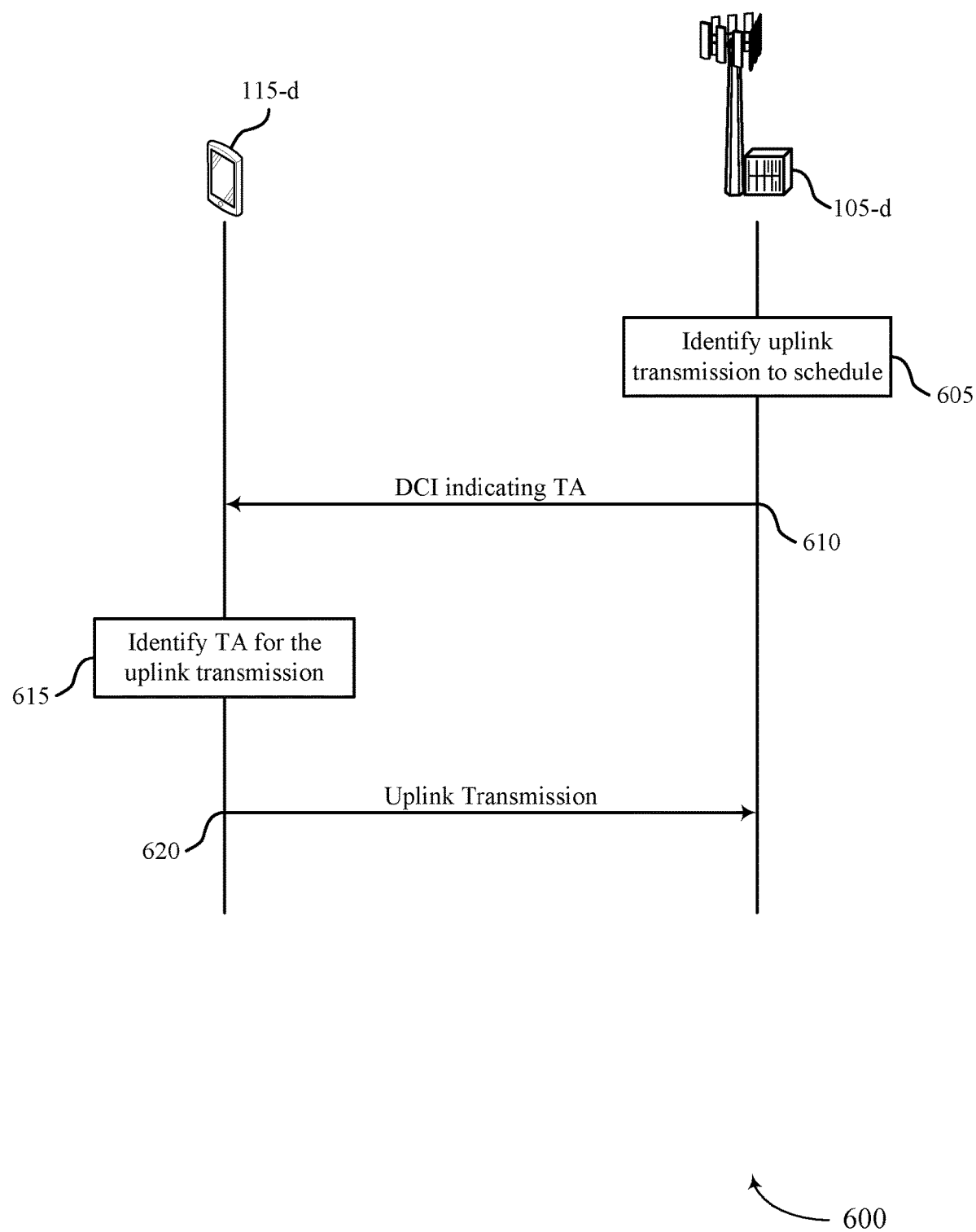
FIG. 6 illustrates an example of a process flow that supports differential control information for multi-beam operation in accordance with aspects of the present disclosure.

FIG. 6 illustrates an example of a process flow 600 that supports differential control information for multi-beam operation in accordance with aspects of the present disclosure. Process flow 600 illustrates aspects of techniques performed by a UE 115-d, which may be an example of a UE 115 described with reference to FIGS. 1-5. Process flow 600 also illustrates aspects of techniques performed by a base station 105-d, which may be an example of a base station 105 described with reference to FIGS. 1-5. Process flow 600 may support efficient techniques for using different configurations for downlink or uplink transmissions on different beams (e.g., associated with different TCI states) to maximize throughput.

At 605, the base station 105-d may identify an uplink transmission to schedule from the UE 115-d to the base station 105-d. The base station 105-d may also identify the TCI state associated with the uplink transmission. At 610, the base station 105-d may transmit DCI scheduling the uplink transmission. Further, the base station 105-d may transmit an indication in the DCI of whether the UE 115-d is to use a first timing advance or a second timing advance for the uplink transmission. The UE 115-d may receive the DCI and may identify the indication of whether to use the first timing advance or the second timing advance for the uplink transmission in the DCI. At 615, the UE 115-d may then identify the timing advance for the uplink transmission based on the indication.

At 620, the UE 115-d may transmit the uplink transmission using the first timing advance or the second timing advance based on the indication in the DCI. As an example, the indication may be a single bit, and, if the single bit indicates that the UE 115-d is to use the first timing advance (e.g., if the single bit is a zero), the UE 115-d may transmit the uplink transmission using the first timing advance. Alternatively, if the single bit indicates that the UE 115-d is to use the second timing advance (e.g., if the single bit is a one), the UE 115-d may transmit the uplink transmission using the second timing advance. The UE 115-d may identify the first timing advance in a random-access procedure (e.g., receiving the first timing advance in a RAR). The second timing advance may be associated with the TCI state of the uplink transmission.

Figure 7:
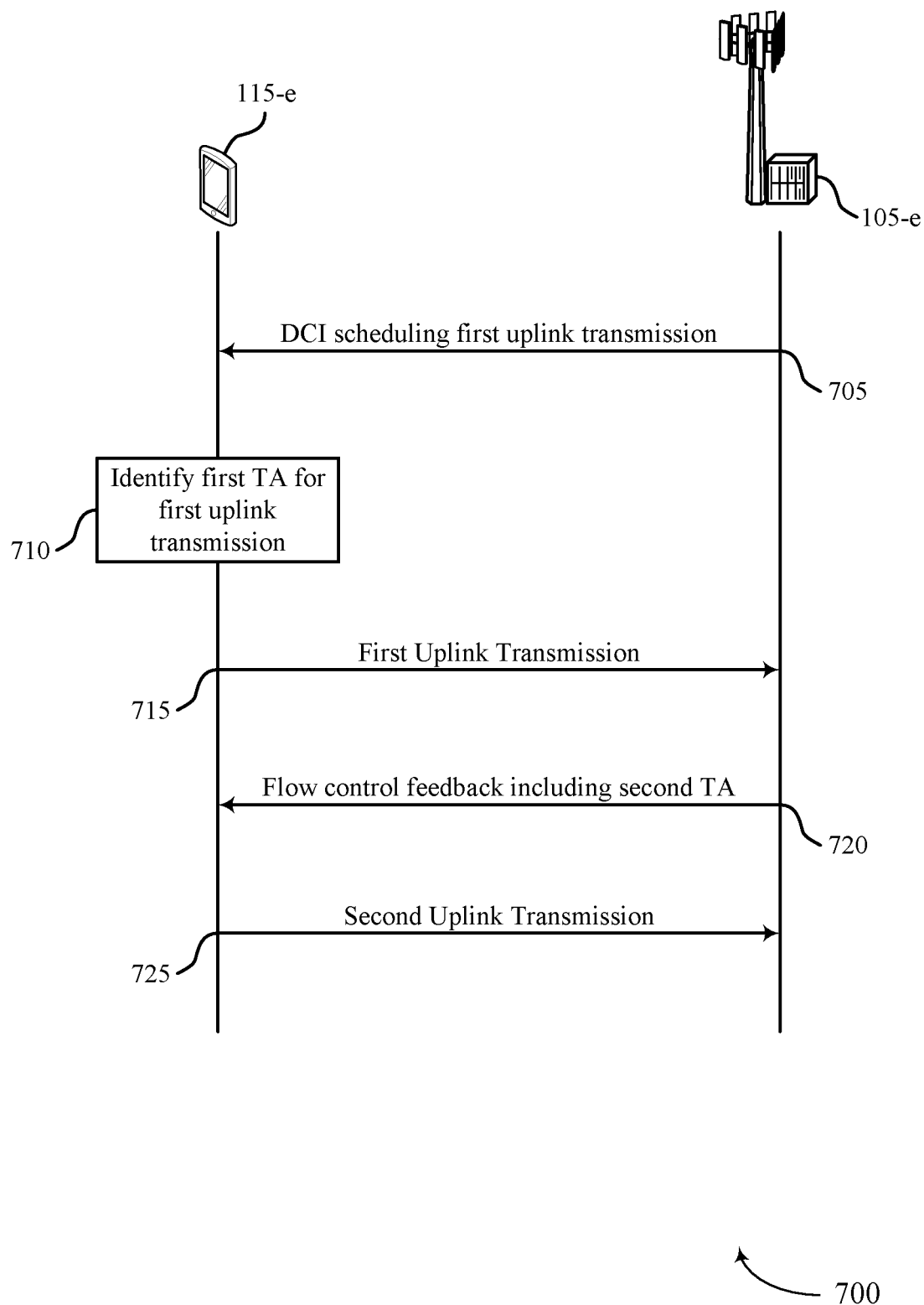
FIG. 7 illustrates an example of a process flow that supports differential control information for multi-beam operation in accordance with aspects of the present disclosure.

FIG. 7 illustrates an example of a process flow 700 that supports differential control information for multi-beam operation in accordance with aspects of the present disclosure. Process flow 700 illustrates aspects of techniques performed by a UE 115-e, which may be an example of a UE 115 described with reference to FIGS. 1-6. Process flow 700 also illustrates aspects of techniques performed by a base station 105-e, which may be an example of a base station 105 described with reference to FIGS. 1-6. Process flow 700 may support efficient techniques for using different configurations for downlink or uplink transmissions on different beams (e.g., associated with different TCI states) to maximize throughput.

At 705, the base station 105-e may transmit DCI scheduling a first uplink transmission from the UE 115-e to the base station 105-e, where the first uplink transmission is associated with a TCI state. At 710, the UE 115-e may identify a first timing advance for the first uplink transmission, and, at 715, the UE 115-e may transmit the first uplink transmission using the first timing advance. The base station 105-e may receive the first uplink transmission and may identify a delta between the first timing advance and a second timing advance to configure at the UE 115-e. At 720, the base station 105-e may transmit, and the UE 115-e may receive, flow control feedback indicating the second timing advance for subsequent uplink transmissions associated with the TCI state from the UE 115-e. In particular, the flow control feedback may indicate a delta between the first timing advance and the second timing advance. The UE 115-e may apply the delta to the first timing advance to identify the second timing advance for subsequent uplink transmission. At 725, the UE 115-e may then transmit a second uplink transmission to the base station 105-e using the second timing advance, the second uplink transmission associated with the TCI state (i.e., the same TCI state as the first uplink transmission).

Figure 8:
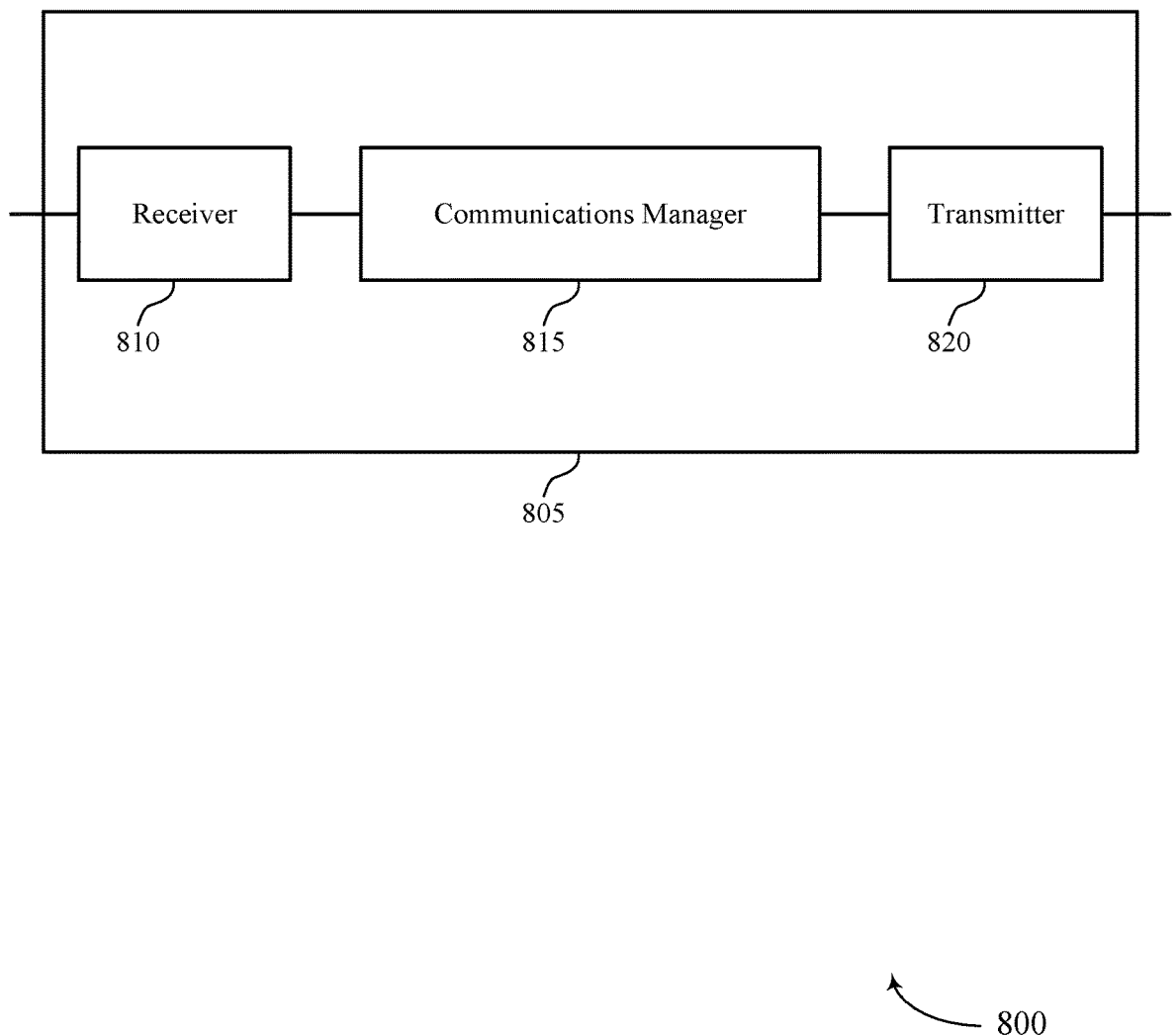
FIGS. 8 and 9 show diagrams of devices that support differential control information for multi-beam operation in accordance with aspects of the present disclosure.

FIG. 8 shows a diagram 800 of a device 805 that supports differential control information for multi-beam operation in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to differential control information for multi-beam operation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, downlink control information scheduling a first downlink transmission associated with a first transmission configuration indication state and a second downlink transmission associated with a second transmission configuration indication state, identify, in the downlink control information, an indication of a first configuration for receiving the first downlink transmission and an indication of a delta between the first configuration and a second configuration for receiving the second downlink transmission, and receive the first downlink transmission using the first configuration and the second downlink transmission using the second configuration.

The communications manager 815 may also receive, from a base station, downlink control information scheduling an uplink transmission from the UE to the base station, the uplink transmission associated with a transmission configuration indication state, identify, in the downlink control information, an indication of whether to use a first timing advance or a second timing advance for the uplink transmission, and transmit the uplink transmission using the first timing advance or the second timing advance based on the indication in the downlink control information.

The communications manager 815 may also receive, from a base station, downlink control information scheduling a first uplink transmission from the UE to the base station, the first uplink transmission associated with a transmission configuration indication state, transmit the first uplink transmission using a first timing advance, transmit a second uplink transmission to the base station using the second timing advance, the second uplink transmission associated with the transmission configuration indication state, and receive flow control feedback from the base station indicating a second timing advance for subsequent uplink transmissions associated with the transmission configuration indication state from the UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

By including or configuring the communications manager 815 in accordance with examples as described herein, the device 805 (e.g., a processor controlling or otherwise coupled to the receiver 810, the transmitter 820, the communications manager 815, or a combination thereof) may support dynamic indications of updated TCI states, which may result in more efficient use of system resources and computational resources, improved throughput, increased system efficiency, and improved user experience.

Figure 9:
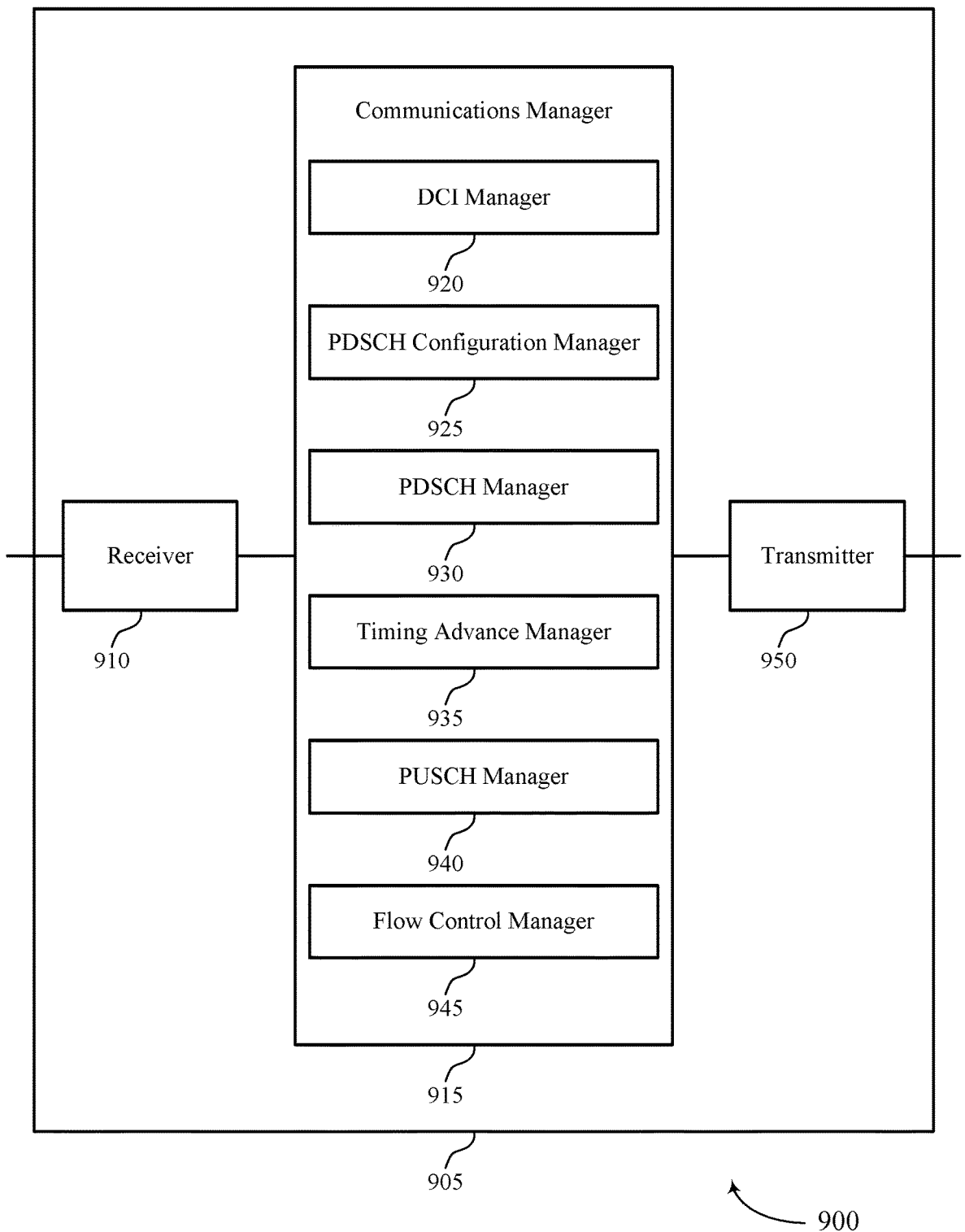

FIG. 9 shows a diagram 900 of a device 905 that supports differential control information for multi-beam operation in accordance with aspects of the present disclosure. The device 905 may be an example of aspects of a device 805, or a UE 115 as described herein. The device 905 may include a receiver 910, a communications manager 915, and a transmitter 950. The device 905 may also include a processor. Each of these components may be in communication with one another (e.g., via one or more buses).

The receiver 910 may receive information such as packets, user data, or control information associated with various information channels (e.g., control channels, data channels, and information related to differential control information for multi-beam operation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a DCI manager 920, a PDSCH configuration manager 925, a PDSCH manager 930, a timing advance manager 935, a PUSCH manager 940, and a flow control manager 945. The communications manager 915 may be an example of aspects of the communications manager 1110 described herein.

The DCI manager 920 may receive, from a base station, downlink control information scheduling a first downlink transmission associated with a first transmission configuration indication state and a second downlink transmission associated with a second transmission configuration indication state. The PDSCH configuration manager 925 may identify, in the downlink control information, an indication of a first configuration for receiving the first downlink transmission and an indication of a delta between the first configuration and a second configuration for receiving the second downlink transmission. The PDSCH manager 930 may receive the first downlink transmission using the first configuration and the second downlink transmission using the second configuration.

The DCI manager 920 may receive, from a base station, downlink control information scheduling an uplink transmission from the UE to the base station, the uplink transmission associated with a transmission configuration indication state. The timing advance manager 935 may identify, in the downlink control information, an indication of whether to use a first timing advance or a second timing advance for the uplink transmission. The PUSCH manager 940 may transmit the uplink transmission using the first timing advance or the second timing advance based on the indication in the downlink control information.

The DCI manager 920 may receive, from a base station, downlink control information scheduling a first uplink transmission from the UE to the base station, the first uplink transmission associated with a transmission configuration indication state. The PUSCH manager 940 may transmit the first uplink transmission using a first timing advance. The flow control manager 945 may receive flow control feedback from the base station indicating a second timing advance for subsequent uplink transmissions associated with the transmission configuration indication state from the UE. The PUSCH manager 940 may transmit a second uplink transmission to the base station using the second timing advance, the second uplink transmission associated with the transmission configuration indication state.

The transmitter 950 may transmit signals generated by other components of the device 905. In some examples, the transmitter 950 may be collocated with a receiver 910 in a transceiver module. For example, the transmitter 950 may be an example of aspects of the transceiver 1120 described with reference to FIG. 11. The transmitter 950 may utilize a single antenna or a set of antennas.

Figure 10:
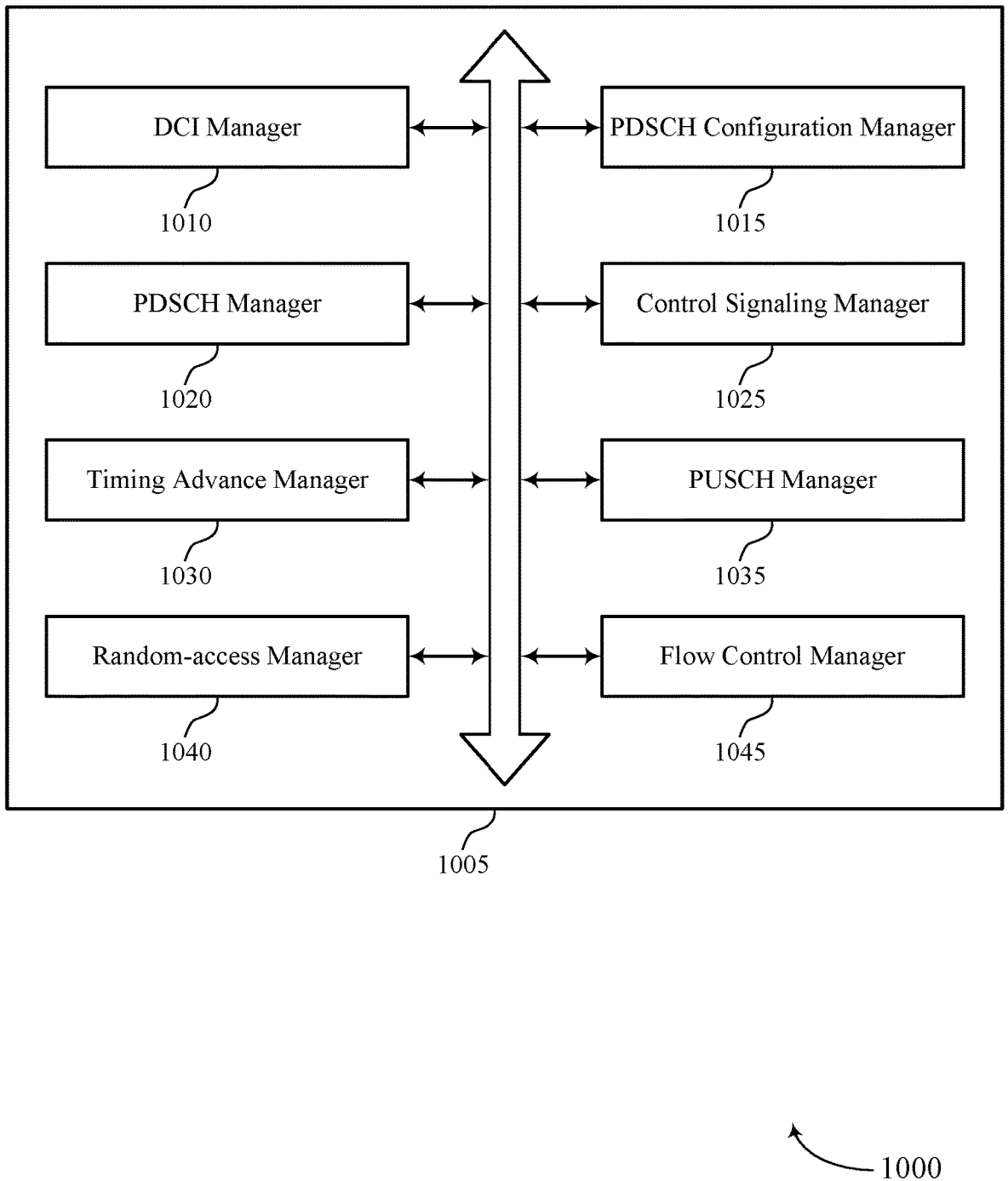
FIG. 10 shows a diagram of a communications manager that supports differential control information for multi-beam operation in accordance with aspects of the present disclosure.

FIG. 10 shows a diagram 1000 of a communications manager 1005 that supports differential control information for multi-beam operation in accordance with aspects of the present disclosure. The communications manager 1005 may be an example of aspects of a communications manager 815, a communications manager 915, or a communications manager 1110 described herein. The communications manager 1005 may include a DCI manager 1010, a PDSCH configuration manager 1015, a PDSCH manager 1020, a control signaling manager 1025, a timing advance manager 1030, a PUSCH manager 1035, a random-access manager 1040, and a flow control manager 1045. Each of these modules may communicate, directly or indirectly, with one another (e.g., via one or more buses).

The DCI manager 1010 may receive, from a base station, downlink control information scheduling a first downlink transmission associated with a first transmission configuration indication state and a second downlink transmission associated with a second transmission configuration indication state. The PDSCH configuration manager 1015 may identify, in the downlink control information, an indication of a first configuration for receiving the first downlink transmission and an indication of a delta between the first configuration and a second configuration for receiving the second downlink transmission. The PDSCH manager 1020 may receive the first downlink transmission using the first configuration and the second downlink transmission using the second configuration.

In some examples, the PDSCH configuration manager 1015 may receive an explicit indication of the first configuration in the downlink control information and an explicit indication of the delta between the first configuration and the second configuration in the downlink control information. The control signaling manager 1025 may receive control signaling indicating a first mapping of indices to configurations for receiving downlink transmissions and a second mapping of indices to deltas between configurations. In some examples, the PDSCH configuration manager 1015 may identify an index in the downlink control information used to indicate a configuration for receiving the first downlink transmission. In some examples, the PDSCH configuration manager 1015 may determine that the index corresponds to the first configuration in the first mapping. In some examples, the PDSCH configuration manager 1015 may identify the first configuration for receiving the first downlink transmission based on the determining.

In some examples, the PDSCH configuration manager 1015 may identify an index in the downlink control information used to indicate a configuration for receiving the second downlink transmission. In some examples, the PDSCH configuration manager 1015 may determine that the index corresponds to the delta between the first configuration and the second configuration in the second mapping. In some examples, the PDSCH configuration manager 1015 may apply the delta to the first configuration. In some examples, the PDSCH configuration manager 1015 may identify the second configuration for receiving the second downlink transmission based on the applying. In some cases, the control signaling includes radio resource control signaling or medium access control signaling.

In some examples, the PDSCH configuration manager 1015 may identify a codepoint in the downlink control information used to indicate a configuration for receiving the first downlink transmission and a configuration for receiving the second downlink transmission. In some examples, the PDSCH configuration manager 1015 may identify a mapping of codepoints to configurations for receiving downlink transmissions, where each codepoint maps to a baseline configuration and one or more delta values. In some examples, determining that the codepoint corresponds to the first configuration and to the delta between the first configuration and the second configuration based on the mapping, where the codepoint includes the indication of the first configuration and the indication of the delta between the first configuration and the second configuration. In some examples, the PDSCH configuration manager 1015 may identify the first configuration for receiving the first downlink transmission and the second configuration for receiving the second downlink transmission based on the determining.

In some examples, the control signaling manager 1025 may receive control signaling indicating the mapping of codepoints to configurations for receiving downlink transmissions. In some cases, the mapping of codepoints to configurations for receiving downlink transmissions is preconfigured at the UE. In some cases, the first configuration or the second configuration includes a modulation and coding scheme, redundancy version, allocation pattern, or a combination thereof.

In some examples, the DCI manager 1010 may receive, from a base station, downlink control information scheduling an uplink transmission from the UE to the base station, the uplink transmission associated with a transmission configuration indication state. The timing advance manager 1030 may identify, in the downlink control information, an indication of whether to use a first timing advance or a second timing advance for the uplink transmission. The PUSCH manager 1035 may transmit the uplink transmission using the first timing advance or the second timing advance based on the indication in the downlink control information. The random-access manager 1040 may transmit a first random-access message to the base station as part of a random-access procedure used to synchronize with the base station. In some examples, the random-access manager 1040 may receive a second random-access message from the base station in response to the first random-access message, the second random-access message indicating the first timing advance. In some cases, the second timing advance is associated with the transmission configuration indication state of the uplink transmission.

In some examples, the DCI manager 1010 may receive, from a base station, downlink control information scheduling a first uplink transmission from the UE to the base station, the first uplink transmission associated with a transmission configuration indication state. In some examples, the PUSCH manager 1035 may transmit the first uplink transmission using a first timing advance. The flow control manager 1045 may receive flow control feedback from the base station indicating a second timing advance for subsequent uplink transmissions associated with the transmission configuration indication state from the UE. In some examples, the PUSCH manager 1035 may transmit a second uplink transmission to the base station using the second timing advance, the second uplink transmission associated with the transmission configuration indication state. In some examples, the timing advance manager 1030 may apply the delta to the first timing advance. In some examples, the timing advance manager 1030 may identify the second timing advance for subsequent uplink transmissions based on the applying.

Figure 11:
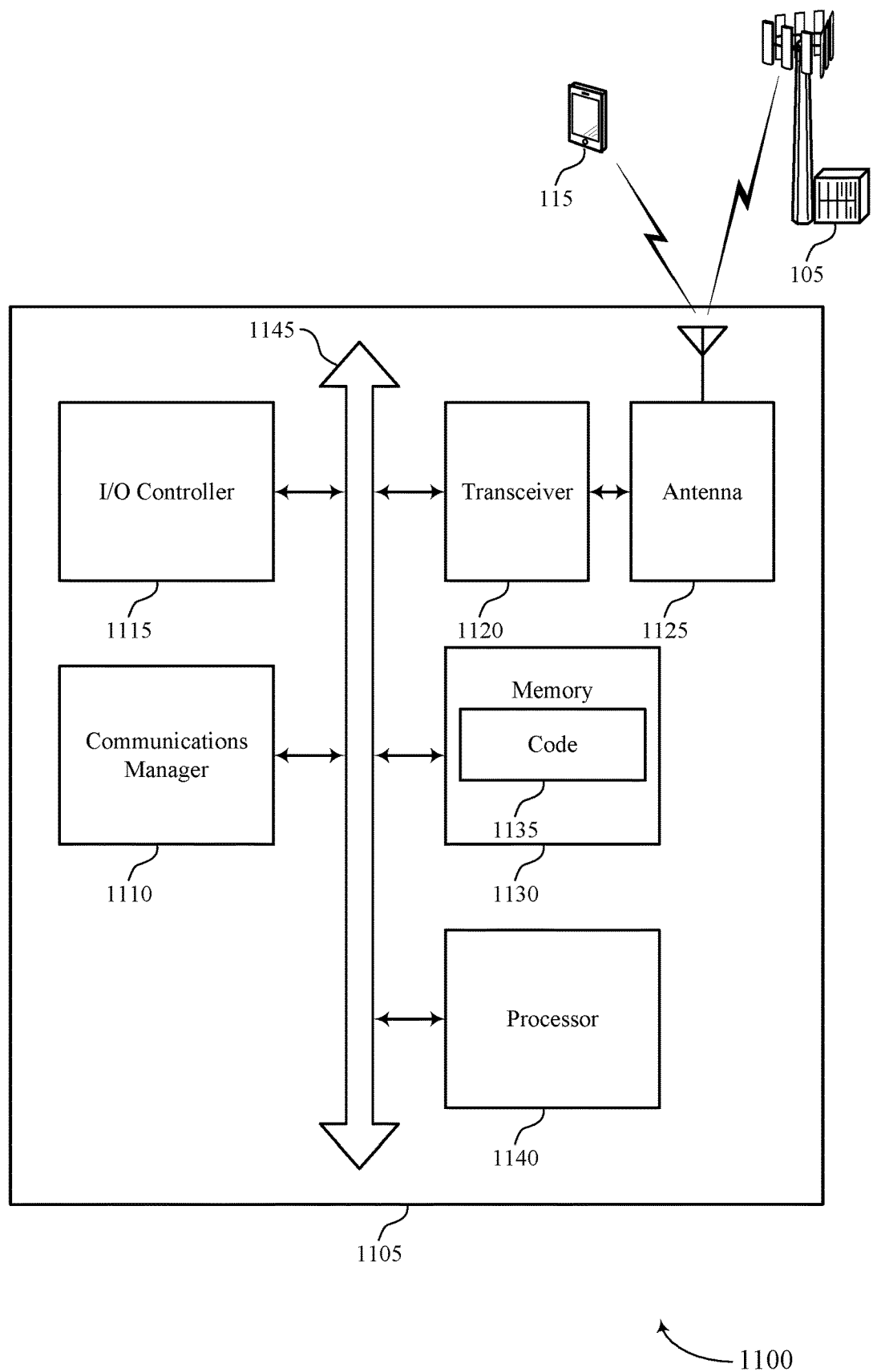
FIG. 11 shows a diagram of a system including a device that supports differential control information for multi-beam operation in accordance with aspects of the present disclosure.

FIG. 11 shows a diagram of a system 1100 including a device 1105 that supports differential control information for multi-beam operation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, downlink control information scheduling a first downlink transmission associated with a first transmission configuration indication state and a second downlink transmission associated with a second transmission configuration indication state, identify, in the downlink control information, an indication of a first configuration for receiving the first downlink transmission and an indication of a delta between the first configuration and a second configuration for receiving the second downlink transmission, and receive the first downlink transmission using the first configuration and the second downlink transmission using the second configuration.

The communications manager 1110 may also receive, from a base station, downlink control information scheduling an uplink transmission from the UE to the base station, the uplink transmission associated with a transmission configuration indication state, identify, in the downlink control information, an indication of whether to use a first timing advance or a second timing advance for the uplink transmission, and transmit the uplink transmission using the first timing advance or the second timing advance based on the indication in the downlink control information.

The communications manager 1110 may also receive, from a base station, downlink control information scheduling a first uplink transmission from the UE to the base station, the first uplink transmission associated with a transmission configuration indication state, transmit the first uplink transmission using a first timing advance, transmit a second uplink transmission to the base station using the second timing advance, the second uplink transmission associated with the transmission configuration indication state, and receive flow control feedback from the base station indicating a second timing advance for subsequent uplink transmissions associated with the transmission configuration indication state from the UE.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a digital signal processor (DSP), a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting differential control information for multi-beam operation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
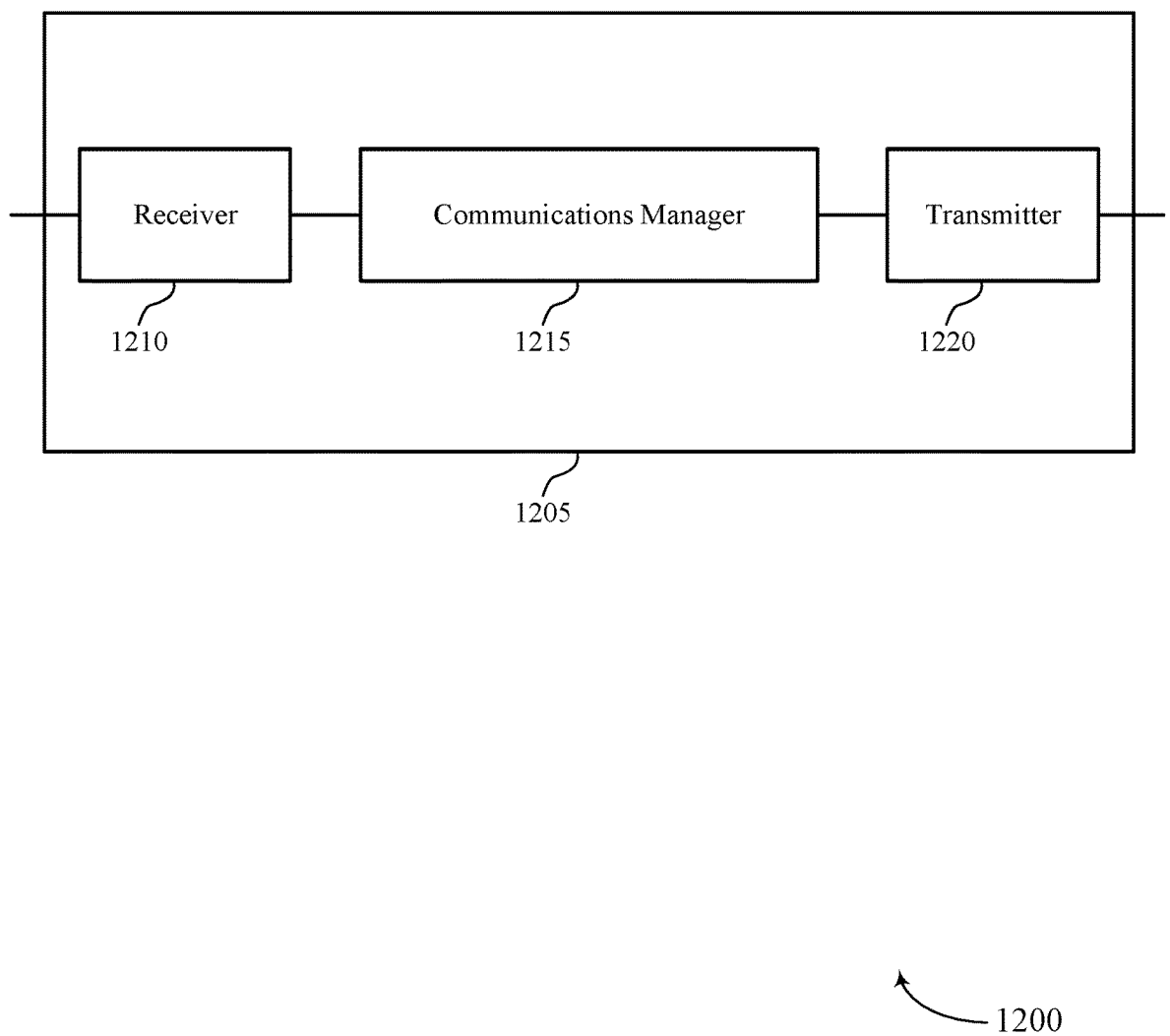
FIGS. 12 and 13 show diagrams of devices that support differential control information for multi-beam operation in accordance with aspects of the present disclosure.

FIG. 12 shows a diagram 1200 of a device 1205 that supports differential control information for multi-beam operation in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to differential control information for multi-beam operation, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a first transmission configuration indication state for transmitting a first downlink transmission to a UE and a second transmission configuration indication state for transmitting a second downlink transmission to the UE, transmit, to the UE in downlink control information scheduling the first downlink transmission and the second downlink transmission, an indication of a first configuration for receiving the first downlink transmission and an indication of a delta between the first configuration and a second configuration for receiving the second downlink transmission, and transmit the first downlink transmission using the first configuration and the second downlink transmission using the second configuration.

The communications manager 1215 may also identify an uplink transmission to schedule from a UE to the base station, the uplink transmission associated with a transmission configuration indication state, receive the uplink transmission from the UE in accordance with the first timing advance or the second timing advance based on the indication in the downlink control information, and transmit, to the UE in downlink control information scheduling the uplink transmission, an indication of whether the UE is to use a first timing advance or a second timing advance for the uplink transmission.

The communications manager 1215 may also transmit, to a UE, downlink control information scheduling a first uplink transmission from the UE to the base station, the first uplink transmission associated with a transmission configuration indication state, receive the first uplink transmission from the UE in accordance with a first timing advance, receive a second uplink transmission from the UE in accordance with the second timing advance, the second uplink transmission associated with the transmission configuration indication state, and transmit flow control feedback to the UE indicating a second timing advance for subsequent uplink transmissions associated with the transmission configuration indication state from the UE. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

By including or configuring the communications manager 1215 in accordance with examples as described herein, the device 1205 (e.g., a processor controlling or otherwise coupled to the receiver 1210, the transmitter 1220, the communications manager 1215, or a combination thereof) may support dynamic indications of updated TCI states, which may result in more efficient use of system resources and computational resources, improved throughput, increased system efficiency, and improved user experience.

Figure 13:
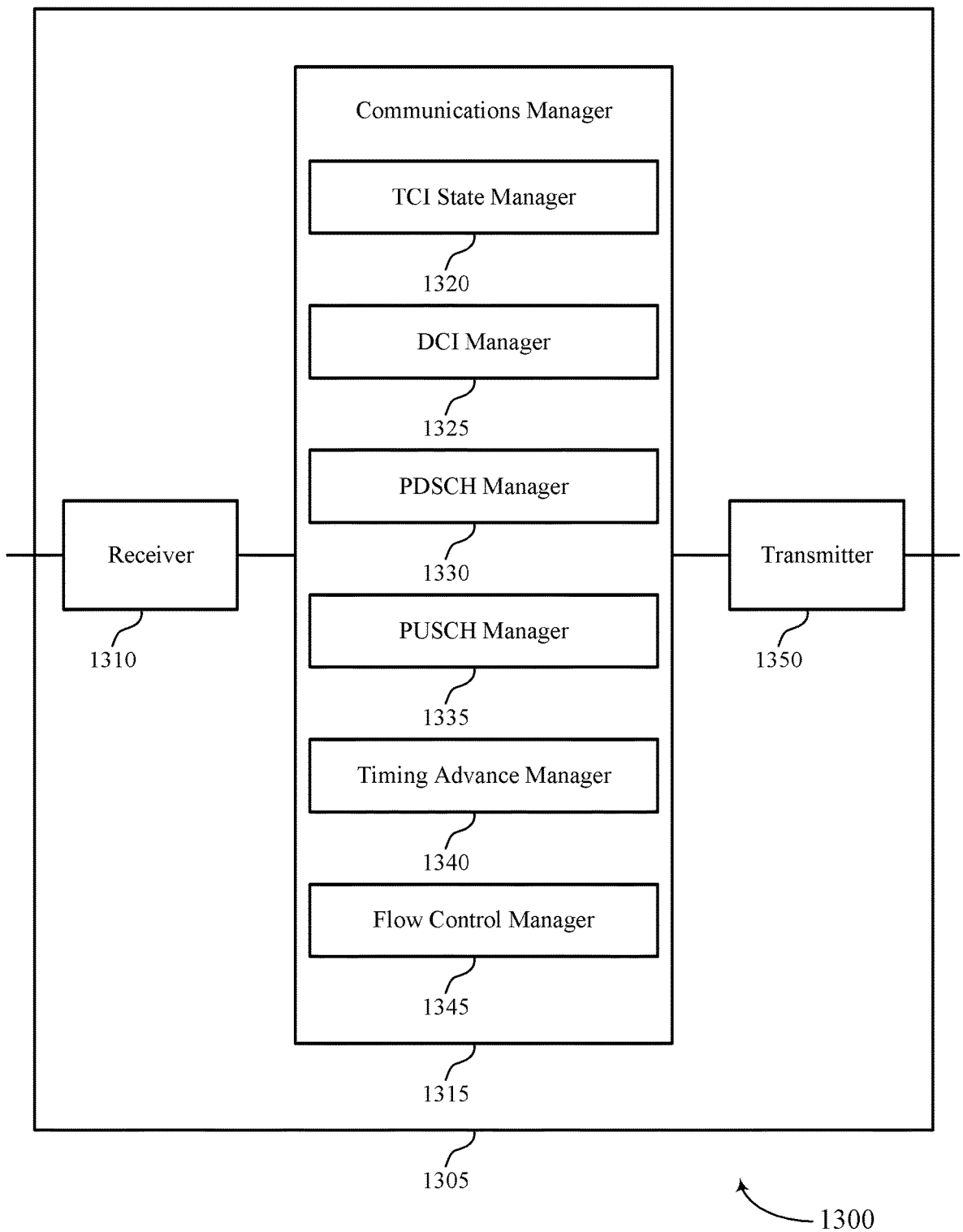

FIG. 13 shows a diagram 1300 of a device 1305 that supports differential control information for multi-beam operation in accordance with aspects of the present disclosure. The device 1305 may be an example of aspects of a device 1205, or a base station 105 as described herein. The device 1305 may include a receiver 1310, a communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to differential control information for multi-beam operation, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a TCI state manager 1320, a DCI manager 1325, a PDSCH manager 1330, a PUSCH manager 1335, a timing advance manager 1340, and a flow control manager 1345. The communications manager 1315 may be an example of aspects of the communications manager 1510 described herein.

The TCI state manager 1320 may identify a first transmission configuration indication state for transmitting a first downlink transmission to a UE and a second transmission configuration indication state for transmitting a second downlink transmission to the UE. The DCI manager 1325 may transmit, to the UE in downlink control information scheduling the first downlink transmission and the second downlink transmission, an indication of a first configuration for receiving the first downlink transmission and an indication of a delta between the first configuration and a second configuration for receiving the second downlink transmission. The PDSCH manager 1330 may transmit the first downlink transmission using the first configuration and the second downlink transmission using the second configuration.

The PUSCH manager 1335 may identify an uplink transmission to schedule from a UE to the base station, the uplink transmission associated with a transmission configuration indication state. The timing advance manager 1340 may transmit, to the UE in downlink control information scheduling the uplink transmission, an indication of whether the UE is to use a first timing advance or a second timing advance for the uplink transmission. The PUSCH manager 1335 may receive the uplink transmission from the UE in accordance with the first timing advance or the second timing advance based on the indication in the downlink control information.

The DCI manager 1325 may transmit, to a UE, downlink control information scheduling a first uplink transmission from the UE to the base station, the first uplink transmission associated with a transmission configuration indication state. The PUSCH manager 1335 may receive the first uplink transmission from the UE in accordance with a first timing advance. The flow control manager 1345 may transmit flow control feedback to the UE indicating a second timing advance for subsequent uplink transmissions associated with the transmission configuration indication state from the UE. The PUSCH manager 1335 may receive a second uplink transmission from the UE in accordance with the second timing advance, the second uplink transmission associated with the transmission configuration indication state.

The transmitter 1350 may transmit signals generated by other components of the device 1305. In some examples, the transmitter 1350 may be collocated with a receiver 1310 in a transceiver module. For example, the transmitter 1350 may be an example of aspects of the transceiver 1520 described with reference to FIG. 15. The transmitter 1350 may utilize a single antenna or a set of antennas.

Figure 14:
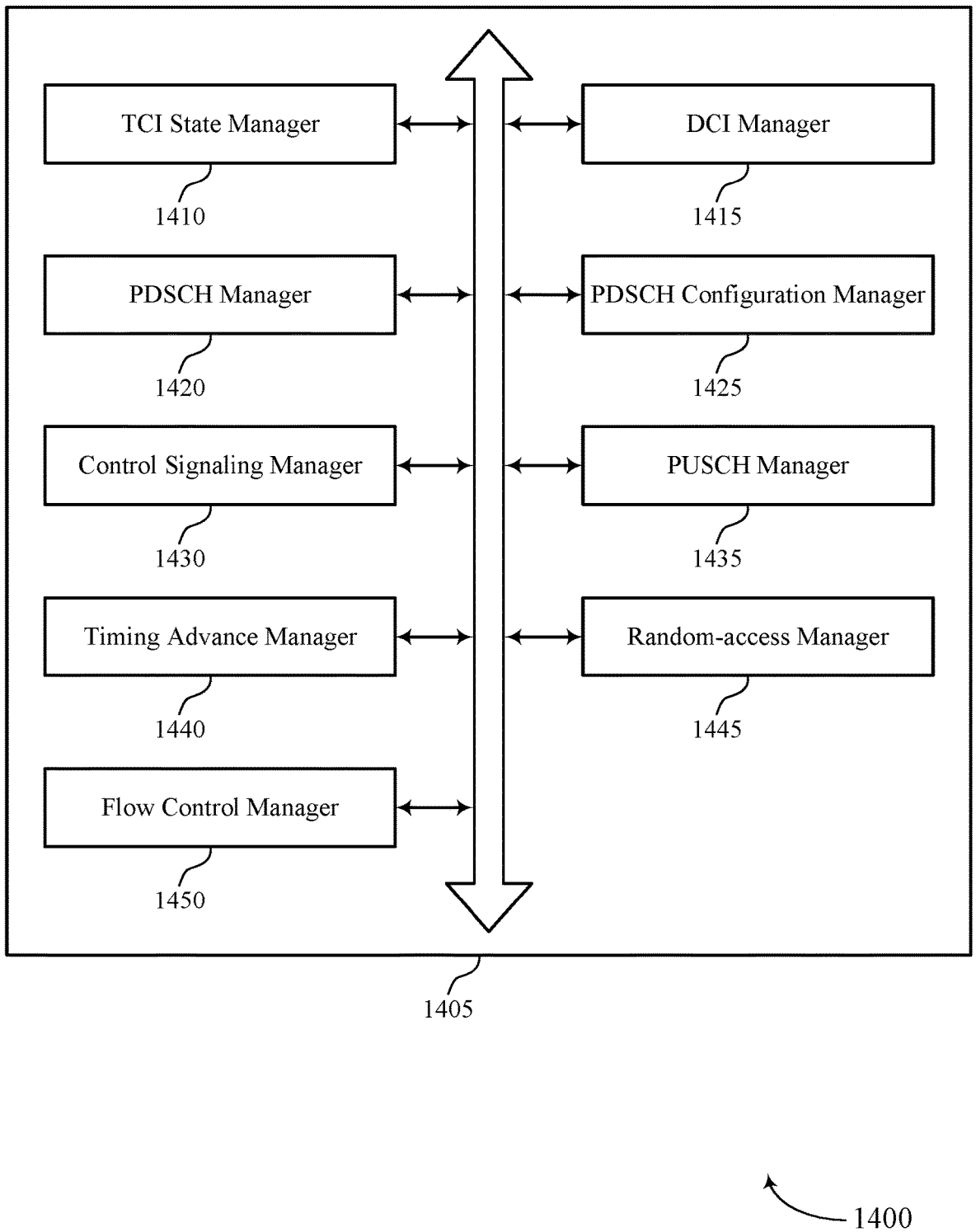
FIG. 14 shows a diagram of a communications manager that supports differential control information for multi-beam operation in accordance with aspects of the present disclosure.

FIG. 14 shows a diagram 1400 of a communications manager 1405 that supports differential control information for multi-beam operation in accordance with aspects of the present disclosure. The communications manager 1405 may be an example of aspects of a communications manager 1215, a communications manager 1315, or a communications manager 1510 described herein. The communications manager 1405 may include a TCI state manager 1410, a DCI manager 1415, a PDSCH manager 1420, a PDSCH configuration manager 1425, a control signaling manager 1430, a PUSCH manager 1435, a timing advance manager 1440, a random-access manager 1445, and a flow control manager 1450. Each of these modules may communicate, directly or indirectly, with one another (e.g., via one or more buses).

The TCI state manager 1410 may identify a first transmission configuration indication state for transmitting a first downlink transmission to a UE and a second transmission configuration indication state for transmitting a second downlink transmission to the UE. The DCI manager 1415 may transmit, to the UE in downlink control information scheduling the first downlink transmission and the second downlink transmission, an indication of a first configuration for receiving the first downlink transmission and an indication of a delta between the first configuration and a second configuration for receiving the second downlink transmission. The PDSCH manager 1420 may transmit the first downlink transmission using the first configuration and the second downlink transmission using the second configuration.

The PDSCH configuration manager 1425 may transmit an explicit indication of the first configuration in the downlink control information, and the PDSCH configuration manager 1425 may transmit an explicit indication of the delta between the first configuration and the second configuration in the downlink control information. The control signaling manager 1430 may transmit control signaling indicating a first mapping of indices to configurations for receiving downlink transmissions and a second mapping of indices to deltas between configurations. In some examples, the PDSCH configuration manager 1425 may transmit an index in the downlink control information indicating the first configuration for receiving the first downlink transmission, where the index corresponds to the first configuration in the first mapping. In some examples, the PDSCH configuration manager 1425 may identify the delta between the first configuration and the second configuration. In some examples, the PDSCH configuration manager 1425 may transmit an index in the downlink control information indicating the delta between the first configuration and the second configuration, where the index corresponds to the delta in the second mapping. In some cases, the control signaling includes radio resource control signaling or medium access control signaling.

In some examples, the PDSCH configuration manager 1425 may identify a mapping of codepoints to configurations for receiving downlink transmissions, where each codepoint maps to a baseline configuration and one or more delta values. The PDSCH configuration manager 1425 may identify a codepoint in the mapping corresponding to the first configuration and the delta between the first configuration and the second configuration, where transmitting the indication of the first configuration and the indication of the second configuration includes transmitting the codepoint in the downlink control information indicating the first configuration and the delta between the first configuration and the second configuration. In some examples, the control signaling manager 1430 may transmit control signaling indicating the mapping of codepoints to configurations for receiving downlink transmissions. In some cases, the mapping of codepoints to configurations for receiving downlink transmissions is preconfigured at the base station. In some cases, the first configuration or the second configuration includes a modulation and coding scheme, redundancy version, allocation pattern, or a combination thereof.

The PUSCH manager 1435 may identify an uplink transmission to schedule from a UE to the base station, the uplink transmission associated with a transmission configuration indication state. The timing advance manager 1440 may transmit, to the UE in downlink control information scheduling the uplink transmission, an indication of whether the UE is to use a first timing advance or a second timing advance for the uplink transmission. In some examples, the PUSCH manager 1435 may receive the uplink transmission from the UE in accordance with the first timing advance or the second timing advance based on the indication in the downlink control information. The random-access manager 1445 may receive a first random-access message from the UE as part of a random-access procedure used to synchronize with the base station. In some examples, the random-access manager 1445 may transmit a second random-access message to the UE in response to the first random-access message, the second random-access message indicating the first timing advance. In some cases, the second timing advance is associated with the transmission configuration indication state of the uplink transmission.

In some examples, the DCI manager 1415 may transmit, to a UE, downlink control information scheduling a first uplink transmission from the UE to the base station, the first uplink transmission associated with a transmission configuration indication state. In some examples, the PUSCH manager 1435 may receive the first uplink transmission from the UE in accordance with a first timing advance. The flow control manager 1450 may transmit flow control feedback to the UE indicating a second timing advance for subsequent uplink transmissions associated with the transmission configuration indication state from the UE. In some examples, the PUSCH manager 1435 may receive a second uplink transmission from the UE in accordance with the second timing advance, the second uplink transmission associated with the transmission configuration indication state. In some examples, the timing advance manager 1440 may identify a delta between the first timing advance and the second timing advance. In some examples, the timing advance manager 1440 may transmit flow control feedback indicating the delta between the first timing advance and the second timing advance based on the identifying.

Figure 15:
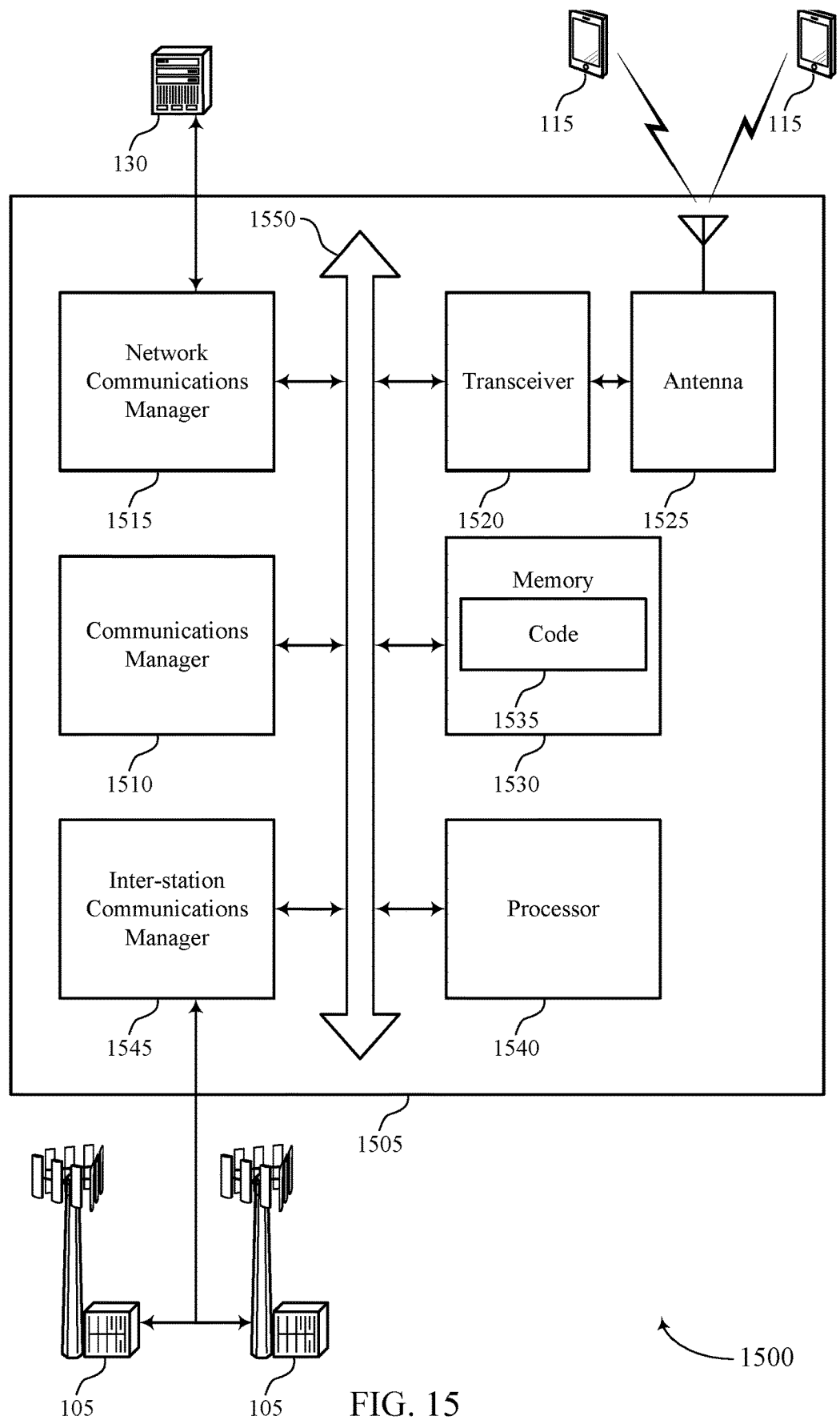
FIG. 15 shows a diagram of a system including a device that supports differential control information for multi-beam operation in accordance with aspects of the present disclosure.

FIG. 15 shows a diagram of a system 1500 including a device 1505 that supports differential control information for multi-beam operation in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a first transmission configuration indication state for transmitting a first downlink transmission to a UE and a second transmission configuration indication state for transmitting a second downlink transmission to the UE, transmit, to the UE in downlink control information scheduling the first downlink transmission and the second downlink transmission, an indication of a first configuration for receiving the first downlink transmission and an indication of a delta between the first configuration and a second configuration for receiving the second downlink transmission, and transmit the first downlink transmission using the first configuration and the second downlink transmission using the second configuration.

The communications manager 1510 may also identify an uplink transmission to schedule from a UE to the base station, the uplink transmission associated with a transmission configuration indication state, receive the uplink transmission from the UE in accordance with the first timing advance or the second timing advance based on the indication in the downlink control information, and transmit, to the UE in downlink control information scheduling the uplink transmission, an indication of whether the UE is to use a first timing advance or a second timing advance for the uplink transmission.

The communications manager 1510 may also transmit, to a UE, downlink control information scheduling a first uplink transmission from the UE to the base station, the first uplink transmission associated with a transmission configuration indication state, receive the first uplink transmission from the UE in accordance with a first timing advance, receive a second uplink transmission from the UE in accordance with the second timing advance, the second uplink transmission associated with the transmission configuration indication state, and transmit flow control feedback to the UE indicating a second timing advance for subsequent uplink transmissions associated with the transmission configuration indication state from the UE.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting differential control information for multi-beam operation).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
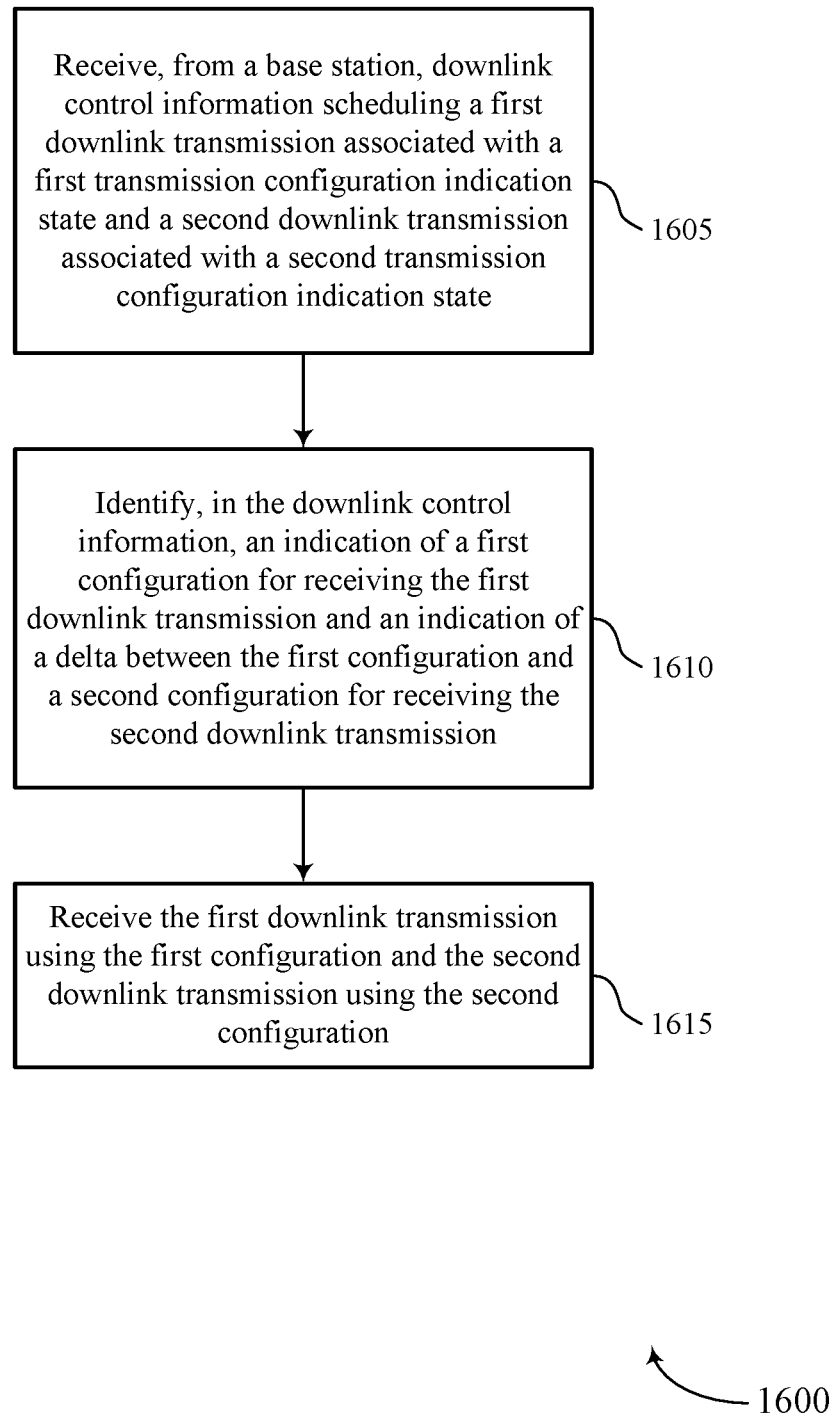
FIGS. 16 through 21 show flowcharts illustrating methods that support differential control information for multi-beam operation in accordance with aspects of the present disclosure.

FIG. 16 shows a flowchart illustrating a method 1600 that supports differential control information for multi-beam operation in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may receive, from a base station, downlink control information scheduling a first downlink transmission associated with a first transmission configuration indication state and a second downlink transmission associated with a second transmission configuration indication state. The operations of 1605 may be performed according to the methods described herein. In some examples, aspects of the operations of 1605 may be performed by a DCI manager as described with reference to FIGS. 8 through 11.

At 1610, the UE may identify, in the downlink control information, an indication of a first configuration for receiving the first downlink transmission and an indication of a delta between the first configuration and a second configuration for receiving the second downlink transmission. The operations of 1610 may be performed according to the methods described herein. In some examples, aspects of the operations of 1610 may be performed by a PDSCH configuration manager as described with reference to FIGS. 8 through 11.

At 1615, the UE may receive the first downlink transmission using the first configuration and the second downlink transmission using the second configuration. The operations of 1615 may be performed according to the methods described herein. In some examples, aspects of the operations of 1615 may be performed by a PDSCH manager as described with reference to FIGS. 8 through 11.

Figure 17:
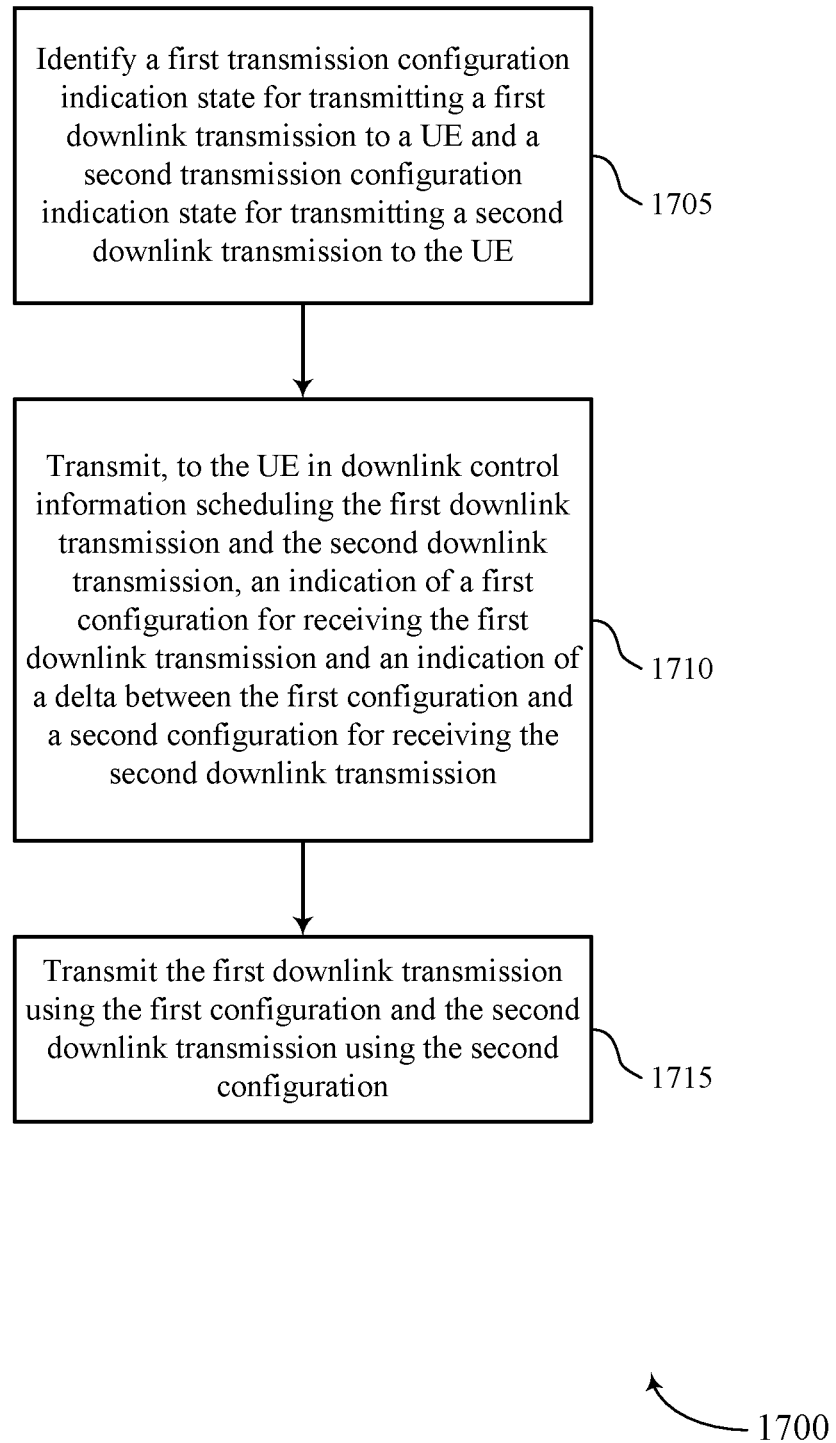

FIG. 17 shows a flowchart illustrating a method 1700 that supports differential control information for multi-beam operation in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may identify a first transmission configuration indication state for transmitting a first downlink transmission to a UE and a second transmission configuration indication state for transmitting a second downlink transmission to the UE. The operations of 1705 may be performed according to the methods described herein. In some examples, aspects of the operations of 1705 may be performed by a TCI state manager as described with reference to FIGS. 12 through 15.

At 1710, the base station may transmit, to the UE in downlink control information scheduling the first downlink transmission and the second downlink transmission, an indication of a first configuration for receiving the first downlink transmission and an indication of a delta between the first configuration and a second configuration for receiving the second downlink transmission. The operations of 1710 may be performed according to the methods described herein. In some examples, aspects of the operations of 1710 may be performed by a DCI manager as described with reference to FIGS. 12 through 15.

At 1715, the base station may transmit the first downlink transmission using the first configuration and the second downlink transmission using the second configuration. The operations of 1715 may be performed according to the methods described herein. In some examples, aspects of the operations of 1715 may be performed by a PDSCH manager as described with reference to FIGS. 12 through 15.

Figure 18:
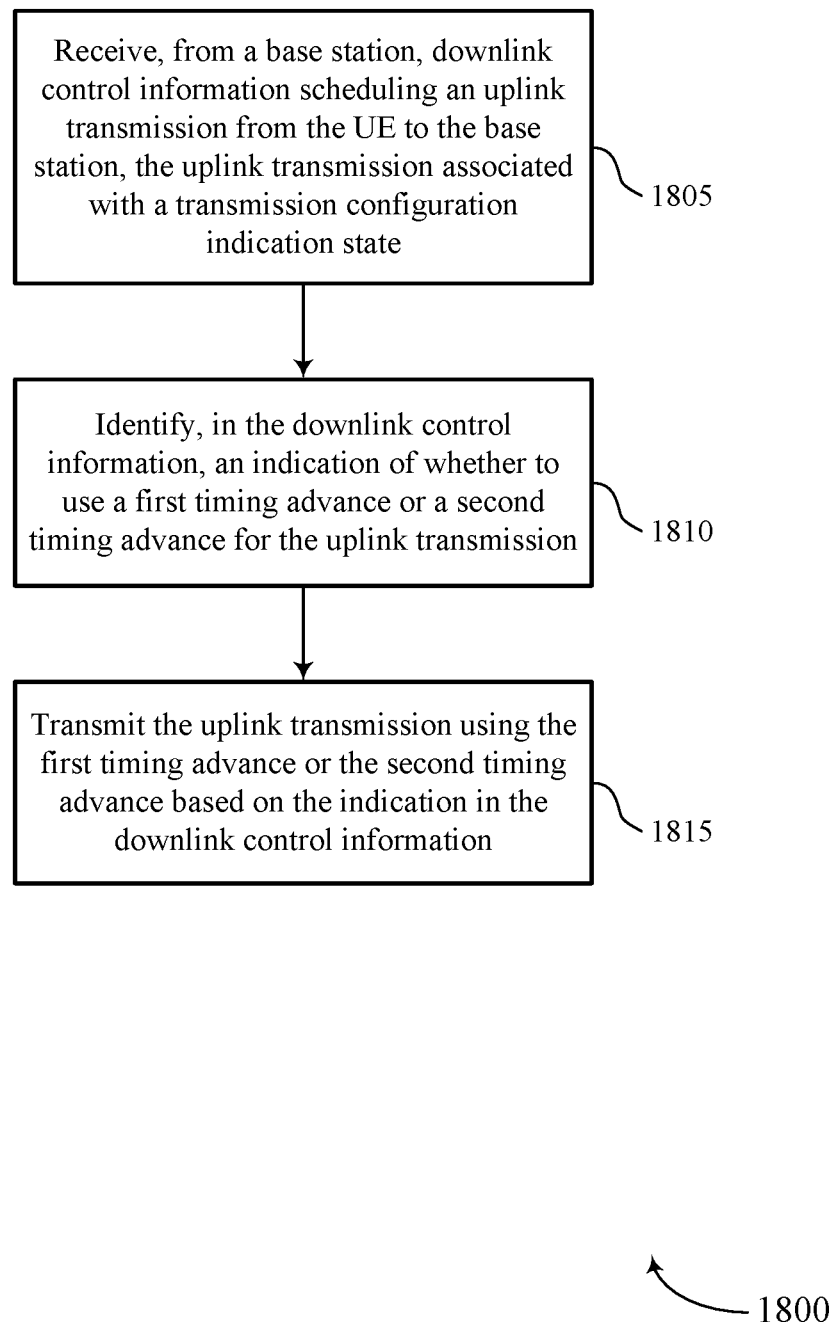

FIG. 18 shows a flowchart illustrating a method 1800 that supports differential control information for multi-beam operation in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1805, the UE may receive, from a base station, downlink control information scheduling an uplink transmission from the UE to the base station, the uplink transmission associated with a transmission configuration indication state. The operations of 1805 may be performed according to the methods described herein. In some examples, aspects of the operations of 1805 may be performed by a DCI manager as described with reference to FIGS. 8 through 11.

At 1810, the UE may identify, in the downlink control information, an indication of whether to use a first timing advance or a second timing advance for the uplink transmission. The operations of 1810 may be performed according to the methods described herein. In some examples, aspects of the operations of 1810 may be performed by a timing advance manager as described with reference to FIGS. 8 through 11.

At 1815, the UE may transmit the uplink transmission using the first timing advance or the second timing advance based on the indication in the downlink control information. The operations of 1815 may be performed according to the methods described herein. In some examples, aspects of the operations of 1815 may be performed by a PUSCH manager as described with reference to FIGS. 8 through 11.

Figure 19:
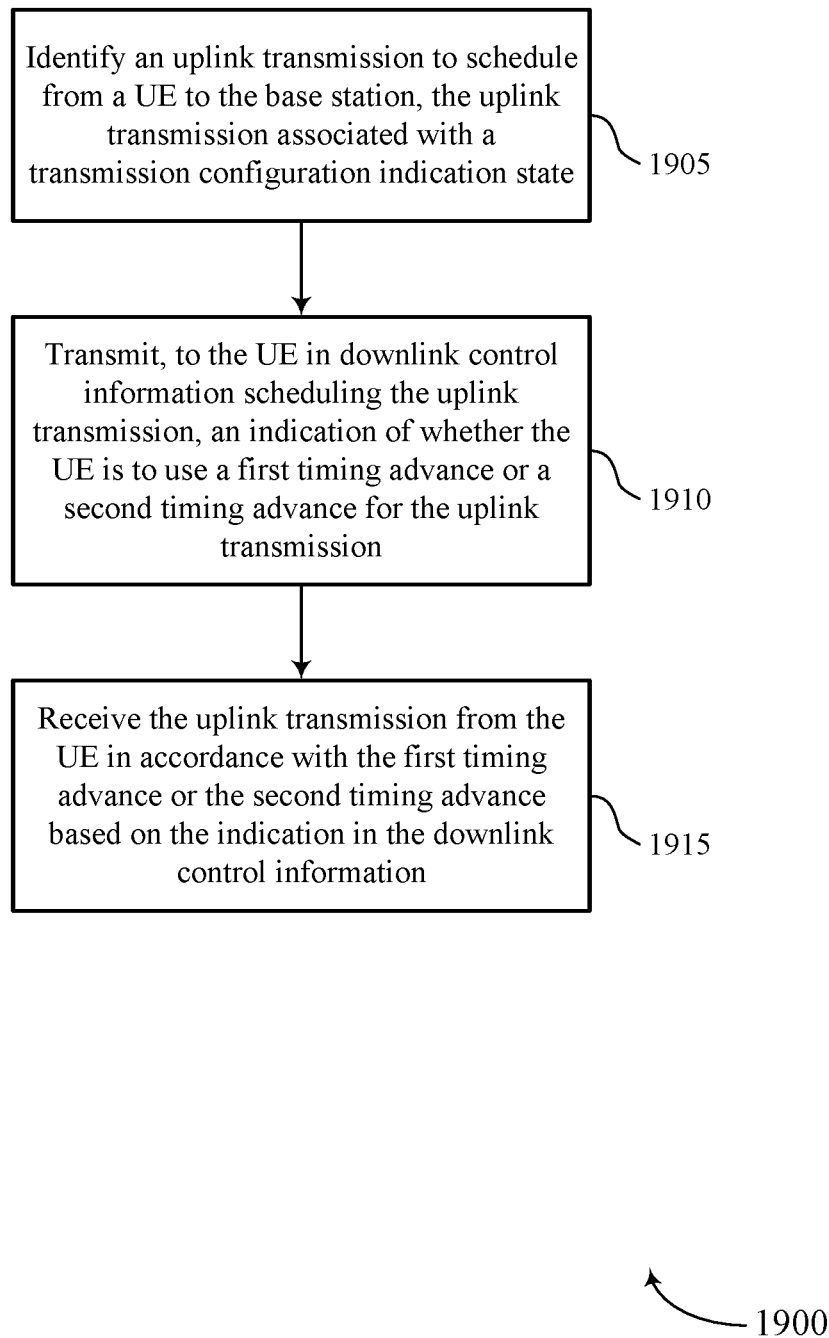

FIG. 19 shows a flowchart illustrating a method 1900 that supports differential control information for multi-beam operation in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1905, the base station may identify an uplink transmission to schedule from a UE to the base station, the uplink transmission associated with a transmission configuration indication state. The operations of 1905 may be performed according to the methods described herein. In some examples, aspects of the operations of 1905 may be performed by a PUSCH manager as described with reference to FIGS. 12 through 15.

At 1910, the base station may transmit, to the UE in downlink control information scheduling the uplink transmission, an indication of whether the UE is to use a first timing advance or a second timing advance for the uplink transmission. The operations of 1910 may be performed according to the methods described herein. In some examples, aspects of the operations of 1910 may be performed by a timing advance manager as described with reference to FIGS. 12 through 15.

At 1915, the base station may receive the uplink transmission from the UE in accordance with the first timing advance or the second timing advance based on the indication in the downlink control information. The operations of 1915 may be performed according to the methods described herein. In some examples, aspects of the operations of 1915 may be performed by a PUSCH manager as described with reference to FIGS. 12 through 15.

Figure 20:
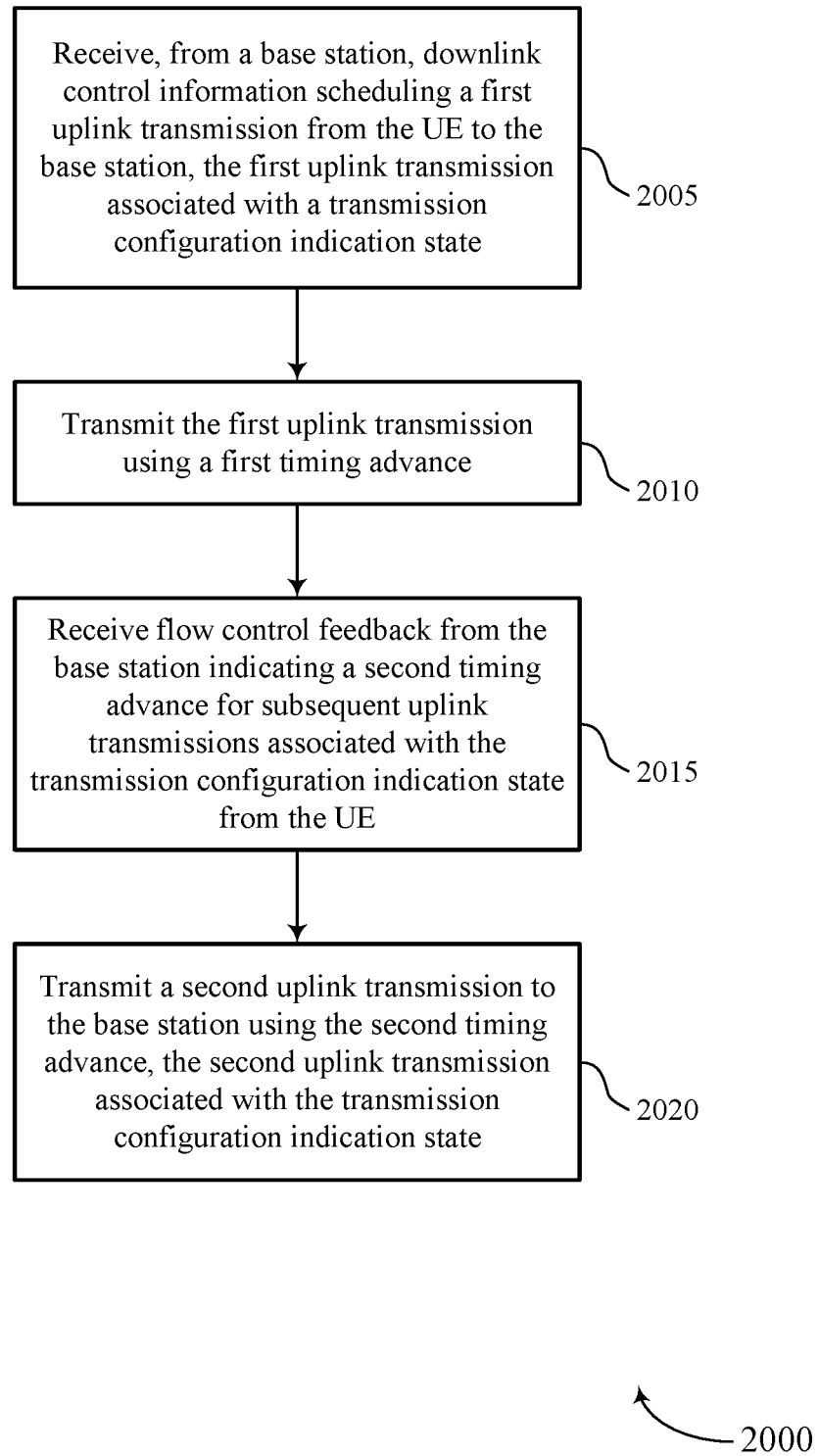

FIG. 20 shows a flowchart illustrating a method 2000 that supports differential control information for multi-beam operation in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 2005, the UE may receive, from a base station, downlink control information scheduling a first uplink transmission from the UE to the base station, the first uplink transmission associated with a transmission configuration indication state. The operations of 2005 may be performed according to the methods described herein. In some examples, aspects of the operations of 2005 may be performed by a DCI manager as described with reference to FIGS. 8 through 11.

At 2010, the UE may transmit the first uplink transmission using a first timing advance. The operations of 2010 may be performed according to the methods described herein. In some examples, aspects of the operations of 2010 may be performed by a PUSCH manager as described with reference to FIGS. 8 through 11.

At 2015, the UE may receive flow control feedback from the base station indicating a second timing advance for subsequent uplink transmissions associated with the transmission configuration indication state from the UE. The operations of 2015 may be performed according to the methods described herein. In some examples, aspects of the operations of 2015 may be performed by a flow control manager as described with reference to FIGS. 8 through 11.

At 2020, the UE may transmit a second uplink transmission to the base station using the second timing advance, the second uplink transmission associated with the transmission configuration indication state. The operations of 2020 may be performed according to the methods described herein. In some examples, aspects of the operations of 2020 may be performed by a PUSCH manager as described with reference to FIGS. 8 through 11.

Figure 21:
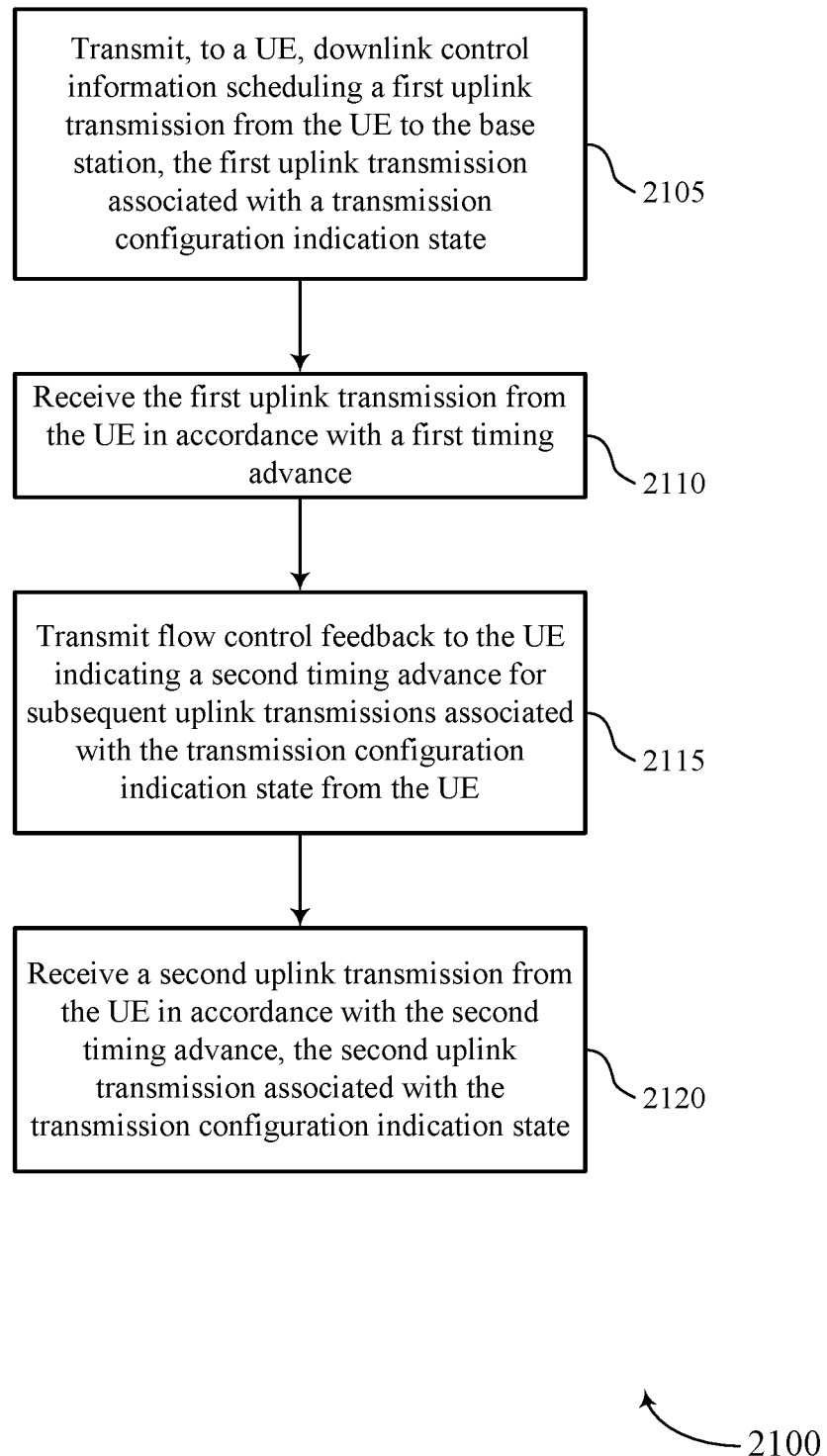

FIG. 21 shows a flowchart illustrating a method 2100 that supports differential control information for multi-beam operation in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 2105, the base station may transmit, to a UE, downlink control information scheduling a first uplink transmission from the UE to the base station, the first uplink transmission associated with a transmission configuration indication state. The operations of 2105 may be performed according to the methods described herein. In some examples, aspects of the operations of 2105 may be performed by a DCI manager as described with reference to FIGS. 12 through 15.

At 2110, the base station may receive the first uplink transmission from the UE in accordance with a first timing advance. The operations of 2110 may be performed according to the methods described herein. In some examples, aspects of the operations of 2110 may be performed by a PUSCH manager as described with reference to FIGS. 12 through 15.

At 2115, the base station may transmit flow control feedback to the UE indicating a second timing advance for subsequent uplink transmissions associated with the transmission configuration indication state from the UE. The operations of 2115 may be performed according to the methods described herein. In some examples, aspects of the operations of 2115 may be performed by a flow control manager as described with reference to FIGS. 12 through 15.

At 2120, the base station may receive a second uplink transmission from the UE in accordance with the second timing advance, the second uplink transmission associated with the transmission configuration indication state. The operations of 2120 may be performed according to the methods described herein. In some examples, aspects of the operations of 2120 may be performed by a PUSCH manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, downlink control information scheduling a first downlink transmission associated with a first transmission configuration indication state and a second downlink transmission associated with a second transmission configuration indication state, the downlink control information comprising an indication of a first configuration for receiving the first downlink transmission and an indication of a delta between the first configuration and a second configuration for receiving the second downlink transmission; and receiving the first downlink transmission using the first configuration and the second downlink transmission using the second configuration.

Aspect 2: The method of aspect 1, further comprising: receiving an explicit indication of the first configuration in the downlink control information and an explicit indication of the delta between the first configuration and the second configuration in the downlink control information.

Aspect 3: The method of any of aspects 1 through 2, further comprising: receiving control signaling indicating a first mapping of indices to configurations for receiving downlink transmissions and a second mapping of indices to deltas between configurations.

Aspect 4: The method of aspect 3, wherein identifying the first configuration for receiving the first downlink transmission comprises: identifying an index in the downlink control information used to indicate a configuration for receiving the first downlink transmission; determining that the index corresponds to the first configuration in the first mapping;

and identifying the first configuration for receiving the first downlink transmission based at least in part on the determining.

Aspect 5: The method of any of aspects 3 through 4, wherein identifying the second configuration for receiving the second downlink transmission comprises: identifying an index in the downlink control information used to indicate a configuration for receiving the second downlink transmission; determining that the index corresponds to the delta between the first configuration and the second configuration in the second mapping; applying the delta to the first configuration; and identifying the second configuration for receiving the second downlink transmission based at least in part on the applying.

Aspect 6: The method of any of aspects 3 through 5, wherein the control signaling comprises radio resource control signaling.

Aspect 7: The method of any of aspects 3 through 6, wherein the control signaling comprises medium access control signaling.

Aspect 8: The method of any of aspects 1 through 7, further comprising: identifying a codepoint in the downlink control information used to indicate a configuration for receiving the first downlink transmission and a configuration for receiving the second downlink transmission; identifying a mapping of codepoints to configurations for receiving downlink transmissions, wherein each codepoint maps to a baseline configuration and one or more delta values; determining that the codepoint corresponds to the first configuration and to the delta between the first configuration and the second configuration based at least in part on the mapping, wherein the codepoint comprises the indication of the first configuration and the indication of the delta between the first configuration and the second configuration; and identifying the first configuration for receiving the first downlink transmission and the second configuration for receiving the second downlink transmission based at least in part on the determining.

Aspect 9: The method of aspect 8, further comprising: receiving control signaling indicating the mapping of codepoints to configurations for receiving downlink transmissions.

Aspect 10: The method of any of aspects 8 through 9, wherein the mapping of codepoints to configurations for receiving downlink transmissions is preconfigured at the UE.

Aspect 11: The method of any of aspects 1 through 10, wherein the first configuration or the second configuration comprises a modulation and coding scheme, redundancy version, allocation pattern, or a combination thereof.

Aspect 12: A method for wireless communication at a base station, comprising: transmitting, to a UE in downlink control information scheduling a first downlink transmission associated with a first transmission configuration state and a second downlink transmission associated with a second transmission configuration state, an indication of a first configuration for receiving the first downlink transmission and an indication of a delta between the first configuration and a second configuration for receiving the second downlink transmission; and transmitting the first downlink transmission using the first configuration and the second downlink transmission using the second configuration.

Aspect 13: The method of aspect 12, wherein transmitting the indication of the first configuration comprises: transmitting an explicit indication of the first configuration in the downlink control information, and wherein transmitting the indication of the delta between the first configuration and the second configuration comprises: transmitting an explicit indication of the delta between the first configuration and the second configuration in the downlink control information.

Aspect 14: The method of any of aspects 12 through 13, further comprising: transmitting control signaling indicating a first mapping of indices to configurations for receiving downlink transmissions and a second mapping of indices to deltas between configurations.

Aspect 15: The method of aspect 14, wherein transmitting the indication of the first configuration for receiving the first downlink transmission comprises: transmitting an index in the downlink control information indicating the first configuration for receiving the first downlink transmission, wherein the index corresponds to the first configuration in the first mapping.

Aspect 16: The method of any of aspects 14 through 15, wherein transmitting the indication of the second configuration for receiving the second downlink transmission comprises: identifying the delta between the first configuration and the second configuration; and transmitting an index in the downlink control information indicating the delta between the first configuration and the second configuration, wherein the index corresponds to the delta in the second mapping.

Aspect 17: The method of any of aspects 14 through 16, wherein the control signaling comprises radio resource control signaling.

Aspect 18: The method of any of aspects 14 through 17, wherein the control signaling comprises medium access control signaling.

Aspect 19: The method of any of aspects 12 through 18, further comprising: identifying a mapping of codepoints to configurations for receiving downlink transmissions, wherein each codepoint maps to a baseline configuration and one or more delta values; identifying a codepoint in the mapping corresponding to the first configuration and the delta between the first configuration and the second configuration, wherein transmitting the indication of the first configuration and the indication of the second configuration comprises: transmitting the codepoint in the downlink control information indicating the first configuration and the delta between the first configuration and the second configuration.

Aspect 20: The method of aspect 19, further comprising: transmitting control signaling indicating the mapping of codepoints to configurations for receiving downlink transmissions.

Aspect 21: The method of any of aspects 19 through 20, wherein the mapping of codepoints to configurations for receiving downlink transmissions is preconfigured at the base station.

Aspect 22: The method of any of aspects 12 through 21, wherein the first configuration or the second configuration comprises a modulation and coding scheme, redundancy version, allocation pattern, or a combination thereof.

Aspect 23: A method for wireless communication at a UE, comprising: receiving, from a base station, downlink control information scheduling an uplink transmission from the UE to the base station, the uplink transmission associated with a transmission configuration indication state, the downlink control information comprising an indication of whether to use a first timing advance or a second timing advance for the uplink transmission; and transmitting the uplink transmission using the first timing advance or the second timing advance based at least in part on the indication in the downlink control information.

Aspect 24: The method of aspect 23, further comprising: transmitting a first random-access message to the base station as part of a random-access procedure used to synchronize with the base station; and receiving a second random-access message from the base station in response to the first random-access message, the second random-access message indicating the first timing advance.

Aspect 25: The method of any of aspects 23 through 24, wherein the second timing advance is associated with the transmission configuration indication state of the uplink transmission.

Aspect 26: The method of any of aspects 23 through 25, wherein a first code point of the indication is associated with the first timing advance, and a second code point of the indication is associated with the second timing advance.

Aspect 27: The method of aspect 26, wherein the indication comprises a single bit in a field of the downlink control information.

Aspect 28: A method for wireless communication at a base station, comprising: identifying an uplink transmission to schedule from a UE to the base station, the uplink transmission associated with a transmission configuration indication state; transmitting, to the UE in downlink control information scheduling the uplink transmission, an indication of whether the UE is to use a first timing advance or a second timing advance for the uplink transmission; and receiving the uplink transmission from the UE in accordance with the first timing advance or the second timing advance based at least in part on the indication in the downlink control information.

Aspect 29: The method of aspect 28, further comprising: receiving a first random-access message from the UE as part of a random-access procedure used to synchronize with the base station; and transmitting a second random-access message to the UE in response to the first random-access message, the second random-access message indicating the first timing advance.

Aspect 30: The method of any of aspects 28 through 29, wherein the second timing advance is associated with the transmission configuration indication state of the uplink transmission.

Aspect 31: A method for wireless communication at a UE, comprising: receiving, from a base station, downlink control information scheduling a first uplink transmission from the UE to the base station, the first uplink transmission associated with a transmission configuration indication state; transmitting the first uplink transmission using a first timing advance; receiving flow control feedback from the base station indicating a second timing advance for subsequent uplink transmissions associated with the transmission configuration indication state from the UE; and transmitting a second uplink transmission to the base station using the second timing advance, the second uplink transmission associated with the transmission configuration indication state.

Aspect 32: The method of aspect 31, wherein the flow control feedback indicates a delta between the first timing advance and the second timing advance, the method further comprising: applying the delta to the first timing advance; and identifying the second timing advance for subsequent uplink transmissions based at least in part on the applying.

Aspect 33: The method of any of aspects 31 through 32, wherein the flow control feedback comprises a hybrid automatic repeat request message indicating that the base station has received the first uplink transmission, and the hybrid automatic repeat request message is multiplexed with an indication of the second timing advance.

Aspect 34: A method for wireless communication at a base station, comprising: transmitting, to a UE, downlink control information scheduling a first uplink transmission from the UE to the base station, the first uplink transmission associated with a transmission configuration indication state; receiving the first uplink transmission from the UE in accordance with a first timing advance; transmitting flow control feedback to the UE indicating a second timing advance for subsequent uplink transmissions associated with the transmission configuration indication state from the UE; and receiving a second uplink transmission from the UE in accordance with the second timing advance, the second uplink transmission associated with the transmission configuration indication state.

Aspect 35: The method of aspect 34, wherein transmitting flow control feedback to the UE indicating the second timing advance comprises: identifying a delta between the first timing advance and the second timing advance; and transmitting flow control feedback indicating the delta between the first timing advance and the second timing advance based at least in part on the identifying.

Aspect 36: An apparatus for wireless communication at a UE, comprising a processor; memory coupled with the processor; and instructions stored in the memory and executable by the processor to cause the apparatus to perform a method of any of aspects 1 through 11.

Aspect 37: An apparatus for wireless communication at a UE, comprising at least one means for performing a method of any of aspects 1 through 11.

Aspect 38: A non-transitory computer-readable medium storing code for wireless communication at a UE, the code comprising instructions executable by a processor to perform a method of any of aspects 1 through 11.

Aspect 39: An apparatus for wireless communication at a base station, comprising a processor; memory coupled with the processor; and instructions stored in the memory and executable by the processor to cause the apparatus to perform a method of any of aspects 12 through 22.

Aspect 40: An apparatus for wireless communication at a base station, comprising at least one means for performing a method of any of aspects 12 through 22.

Aspect 41: A non-transitory computer-readable medium storing code for wireless communication at a base station, the code comprising instructions executable by a processor to perform a method of any of aspects 12 through 22.

Aspect 42: An apparatus for wireless communication at a UE, comprising a processor; memory coupled with the processor; and instructions stored in the memory and executable by the processor to cause the apparatus to perform a method of any of aspects 23 through 27.

Aspect 43: An apparatus for wireless communication at a UE, comprising at least one means for performing a method of any of aspects 23 through 27.

Aspect 44: A non-transitory computer-readable medium storing code for wireless communication at a UE, the code comprising instructions executable by a processor to perform a method of any of aspects 23 through 27.

Aspect 45: An apparatus for wireless communication at a base station, comprising a processor; memory coupled with the processor; and instructions stored in the memory and executable by the processor to cause the apparatus to perform a method of any of aspects 28 through 30.

Aspect 46: An apparatus for wireless communication at a base station, comprising at least one means for performing a method of any of aspects 28 through 30.

Aspect 47: A non-transitory computer-readable medium storing code for wireless communication at a base station, the code comprising instructions executable by a processor to perform a method of any of aspects 28 through 30.

Aspect 48: An apparatus for wireless communication at a UE, comprising a processor; memory coupled with the processor; and instructions stored in the memory and executable by the processor to cause the apparatus to perform a method of any of aspects 31 through 33.

Aspect 49: An apparatus for wireless communication at a UE, comprising at least one means for performing a method of any of aspects 31 through 33.

Aspect 50: A non-transitory computer-readable medium storing code for wireless communication at a UE, the code comprising instructions executable by a processor to perform a method of any of aspects 31 through 33.

Aspect 51: An apparatus for wireless communication at a base station, comprising a processor; memory coupled with the processor; and instructions stored in the memory and executable by the processor to cause the apparatus to perform a method of any of aspects 34 through 35.

Aspect 52: An apparatus for wireless communication at a base station, comprising at least one means for performing a method of any of aspects 34 through 35.

Aspect 53: A non-transitory computer-readable medium storing code for wireless communication at a base station, the code comprising instructions executable by a processor to perform a method of any of aspects 34 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving control signaling indicating a first mapping of indices to configurations for receiving downlink transmissions and a second mapping of indices to differential values between configurations;
    receiving, from an access network entity, downlink control information scheduling a first downlink transmission associated with a first transmission configuration indication state and a second downlink transmission associated with a second transmission configuration indication state, the downlink control information comprising an indication of a first configuration for receiving the first downlink transmission and an indication of a differential value between the first configuration and a second configuration for receiving the second downlink transmission; and
    receiving the first downlink transmission using the first configuration and the second downlink transmission using the second configuration.

2. The method of claim 1, further comprising:
    receiving an explicit indication of the first configuration in the downlink control information and an explicit indication of the differential value between the first configuration and the second configuration in the downlink control information.

3. The method of claim 1, further comprising:
    identifying an index in the downlink control information used to indicate a configuration for receiving the first downlink transmission;
    determining that the index corresponds to the first configuration in the first mapping; and
    identifying the first configuration for receiving the first downlink transmission based at least in part on the determining.

4. The method of claim 1, further comprising:
    identifying an index in the downlink control information used to indicate a configuration for receiving the second downlink transmission;
    determining that the index corresponds to the differential value between the first configuration and the second configuration in the second mapping;
    applying the differential value to the first configuration; and
    identifying the second configuration for receiving the second downlink transmission based at least in part on the applying.

5. The method of claim 1, wherein the control signaling comprises radio resource control signaling.

6. The method of claim 1, wherein the control signaling comprises medium access control signaling.

7. The method of claim 1, further comprising:
    identifying a codepoint in the downlink control information used to indicate a configuration for receiving the first downlink transmission and a configuration for receiving the second downlink transmission;
    identifying a mapping of codepoints to configurations for receiving downlink transmissions, wherein each codepoint maps to a baseline configuration and one or more differential values;
    determining that the codepoint corresponds to the first configuration and to the differential value between the first configuration and the second configuration based at least in part on the mapping, wherein the codepoint comprises the indication of the first configuration and the indication of the differential value between the first configuration and the second configuration; and
    identifying the first configuration for receiving the first downlink transmission and the second configuration for receiving the second downlink transmission based at least in part on the determining.

8. The method of claim 7, further comprising:
    receiving control signaling indicating the mapping of codepoints to configurations for receiving downlink transmissions.

9. The method of claim 7, wherein the mapping of codepoints to configurations for receiving downlink transmissions is preconfigured at the UE.

10. The method of claim 1, wherein the first configuration or the second configuration comprises a modulation and coding scheme, redundancy version, allocation pattern, or a combination thereof.

11. A method for wireless communication at an access network entity, comprising:
    transmitting control signaling indicating a first mapping of indices to configurations for receiving downlink transmissions and a second mapping of indices to differential values between configurations;
    transmitting, to a user equipment (UE) in downlink control information scheduling a first downlink transmission associated with a first transmission configuration state and a second downlink transmission associated with a second transmission configuration state, an indication of a first configuration for receiving the first downlink transmission and an indication of a differential value between the first configuration and a second configuration for receiving the second downlink transmission; and
    transmitting the first downlink transmission using the first configuration and the second downlink transmission using the second configuration.

12. The method of claim 11, wherein transmitting the indication of the first configuration comprises:

transmitting an explicit indication of the first configuration in the downlink control information, and wherein transmitting the indication of the differential value between the first configuration and the second configuration comprises:
transmitting an explicit indication of the differential value between the first configuration and the second configuration in the downlink control information.

13. The method of claim 11, wherein transmitting the indication of the first configuration for receiving the first downlink transmission comprises:
transmitting an index in the downlink control information indicating the first configuration for receiving the first downlink transmission, wherein the index corresponds to the first configuration in the first mapping.

14. The method of claim 11, wherein transmitting the indication of the second configuration for receiving the second downlink transmission comprises:
identifying the differential value between the first configuration and the second configuration; and
transmitting an index in the downlink control information indicating the differential value between the first configuration and the second configuration, wherein the index corresponds to the differential value in the second mapping.

15. The method of claim 11, wherein the control signaling comprises radio resource control signaling.

16. The method of claim 11, wherein the control signaling comprises medium access control signaling.

17. The method of claim 11, further comprising:
identifying a mapping of codepoints to configurations for receiving downlink transmissions, wherein each codepoint maps to a baseline configuration and one or more differential values;
identifying a codepoint in the mapping corresponding to the first configuration and the differential value between the first configuration and the second configuration, wherein transmitting the indication of the first configuration and the indication of the second configuration comprises:
transmitting the codepoint in the downlink control information indicating the first configuration and the differential value between the first configuration and the second configuration.

18. The method of claim 17, further comprising:
transmitting control signaling indicating the mapping of codepoints to configurations for receiving downlink transmissions.

19. The method of claim 17, wherein the mapping of codepoints to configurations for receiving downlink transmissions is preconfigured at the access network entity.

20. The method of claim 11, wherein the first configuration or the second configuration comprises a modulation and coding scheme, redundancy version, allocation pattern, or a combination thereof.

21. An apparatus for wireless communication at a user equipment (UE), comprising:
a processor;
a memory coupled with the processor; and
instructions stored in the memory and executable by the processor to cause the apparatus to:
receive control signaling indicating a first mapping of indices to configurations for receiving downlink transmissions and a second mapping of indices to differential values between configurations;
receive, from an access network entity, downlink control information scheduling a first downlink transmission associated with a first transmission configuration indication state and a second downlink transmission associated with a second transmission configuration indication state, the downlink control information comprising an indication of a first configuration for receiving the first downlink transmission and an indication of a differential value between the first configuration and a second configuration for receiving the second downlink transmission; and
receive the first downlink transmission using the first configuration and the second downlink transmission using the second configuration.

22. The apparatus of claim 21, wherein the instructions are further executable by the processor to cause the apparatus to:
receive an explicit indication of the first configuration in the downlink control information and an explicit indication of the differential value between the first configuration and the second configuration in the downlink control information.

23. The apparatus of claim 21, wherein the instructions are executable by the processor to cause the apparatus to:
identify an index in the downlink control information used to indicate a configuration for receiving the first downlink transmission;
determine that the index corresponds to the first configuration in the first mapping; and
identify the first configuration for receiving the first downlink transmission based at least in part on the determining.

24. The apparatus of claim 21, wherein the instructions are executable by the processor to cause the apparatus to:
identify an index in the downlink control information used to indicate a configuration for receiving the second downlink transmission;
determine that the index corresponds to the differential value between the first configuration and the second configuration in the second mapping;
apply the differential value to the first configuration; and
identify the second configuration for receiving the second downlink transmission based at least in part on the applying.

25. The apparatus of claim 21, wherein:
the control signaling comprises radio resource control signaling.

26. The apparatus of claim 21, wherein:
the control signaling comprises medium access control signaling.

27. An apparatus for wireless communication at an access network entity, comprising:
a processor;
a memory coupled with the processor; and
instructions stored in the memory and executable by the processor to cause the apparatus to:
transmit control signaling indicating a first mapping of indices to configurations for receiving downlink transmissions and a second mapping of indices to differential values between configurations;
transmit, to a user equipment (UE) in downlink control information scheduling a first downlink transmission associated with a first transmission configuration state and a second downlink transmission associated with a second transmission configuration state, an indication of a first configuration for receiving the first downlink transmission and an indication of a differential value between the first configuration and a second configuration for receiving the second downlink transmission; and transmit the first downlink transmission using the first configuration and the second downlink transmission using the second configuration.

* * * * *